(12) United States Patent
de Lima et al.

(10) Patent No.: US 11,222,013 B2
(45) Date of Patent: Jan. 11, 2022

(54) CUSTOM NAMED ENTITIES AND TAGS FOR NATURAL LANGUAGE SEARCH QUERY PROCESSING

(71) Applicant: SAP SE, Walldorf (DE)

(72) Inventors: Erika Fonseca de Lima, Heidelberg (DE); Juergen Hofmann, Gorxheimertal (DE); Thomas Finke, Hockenheim (DE)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 16/688,527

(22) Filed: Nov. 19, 2019

(65) Prior Publication Data
US 2021/0149901 A1    May 20, 2021

(51) Int. Cl.
| G06F 16/2452 | (2019.01) |
| G06F 16/22 | (2019.01) |
| G06F 40/169 | (2020.01) |
| G06F 40/284 | (2020.01) |
| G06F 40/295 | (2020.01) |

(52) U.S. Cl.
CPC .... *G06F 16/24522* (2019.01); *G06F 16/2282* (2019.01); *G06F 40/169* (2020.01); *G06F 40/284* (2020.01); *G06F 40/295* (2020.01)

(58) Field of Classification Search
CPC .......... G06F 16/24522; G06F 16/2282; G06F 40/169; G06F 40/284; G06F 40/295
See application file for complete search history.

(56) References Cited

U.S. PATENT DOCUMENTS

| 7,809,751 B2 | 10/2010 | Fuerst et al. |
| 8,458,189 B1 | 6/2013 | Ludwig et al. |
| 8,812,509 B1 | 8/2014 | Pasca et al. |
| 9,406,020 B2 | 8/2016 | Arroyo et al. |
| 9,602,987 B1 | 3/2017 | Wittig |
| 9,721,002 B2 | 8/2017 | Pfeifer et al. |
| 9,864,795 B1 | 1/2018 | Halevy et al. |

(Continued)

OTHER PUBLICATIONS

Waite, "Text Analysis: Natural Language Processing as a Core Feature of SAP HANA", downloaded from https://blogs.sap.com/2014/09/08/text-analysis-natural-language-processing-as-a-core-feature-of-sap-hana/, 5 pages (document marked Sep. 2014).

Saha et al., "Natural language querying in SAP-ERP platform", ESEC/FSE 2017, *Proceedings of the 2017 11th Joint Meeting on Foundations of Software Engineering*, pp. 878-883 (Sep. 2017).

Mamidela, "SAP HANA TA—Text Analysis", downloaded from https://blogs.sap.com/2017/05/21/sap-hana-ta-text-analysis/, 26 pages (document marked May 2017).

(Continued)

*Primary Examiner* — Matthew J Ellis
(74) *Attorney, Agent, or Firm* — Klarquist Sparkman, LLP

(57) ABSTRACT

Methods and apparatus are disclosed for building a library of custom named entities for a database environment and using the library for processing natural language search queries. At configuration time, custom named entities are extracted or derived from a search model or the database environment. Records for the custom entities with associated database unique identifiers and tags are stored in a library. Custom entities can be based on labels of database objects, variants thereof, or domain values. At search time, a natural language query is tokenized and matched with custom entities from the library, and with other predefined named entities, to obtained structured search descriptors. For more efficient search, compound entities can be identified in the search string, comprising a custom entity and a value, or a custom entity and another token sequence. Variations and examples are disclosed.

20 Claims, 11 Drawing Sheets

(56) References Cited

U.S. PATENT DOCUMENTS

| | | | |
|---|---|---|---|
| 10,095,766 B2 | 10/2018 | Kapoor et al. | |
| 10,552,462 B1* | 2/2020 | Hart | G06F 16/907 |
| 2012/0290292 A1 | 11/2012 | Liu et al. | |
| 2013/0018653 A1* | 1/2013 | Fux | G06F 1/1626 |
| | | | 704/9 |
| 2013/0166550 A1 | 6/2013 | Buchmann et al. | |
| 2013/0166563 A1 | 6/2013 | Mueller et al. | |
| 2014/0149401 A1* | 5/2014 | Liu | G06F 16/951 |
| | | | 707/723 |
| 2016/0037227 A1* | 2/2016 | Benn | H04N 21/4821 |
| | | | 725/53 |
| 2017/0109355 A1* | 4/2017 | Li | G06N 3/0445 |
| 2017/0142200 A1* | 5/2017 | Kodner | H04L 67/22 |
| 2018/0075161 A1* | 3/2018 | Saeed | G06F 16/9024 |
| 2019/0197185 A1 | 6/2019 | Miseldine et al. | |
| 2020/0034362 A1* | 1/2020 | Galitsky | G06F 40/247 |

OTHER PUBLICATIONS

"SAP HANA Text Analysis Language Reference Guide", downloaded from https://help.sap.com/viewer/e2f20c473359495b986337fb62d9d3cb/2.0.01/en-US, pp. 1-356 (document marked Jan. 2018).

"SAP HANA Text Analysis Developer Guide", downloaded from https://help.sap.com/viewer/62e301bb1872437cbb2a8c4209f74a65/2.0.02/en-US, pp. 1-88 (document marked Oct. 2018).

"SAP Named a Strong Performer in Natural Language Generation for Analytics by Independent Research Firm", downloaded from https://news.sap.com/2018/12/sap-analytics-cloud-natural-language-generation-forrester/, 5 pages (document marked Dec. 2018).

"SAP Analytics Cloud Help", downloaded from https://help.sap.com/viewer/00f68c2e08b941f081002fd3691d86a7/release/en-US, 6 pages (document marked Q3 2019).

Shealy, "7 Ways AI is Changing How We Communicate", downloaded from https://blogs.sap.com/2019/11/05/7-ways-ai-is-changing-how-we-communicate/, 4 pages (document marked Nov. 2019).

* cited by examiner

FIG. 8   800 ⟶

CUSTOM NAMED ENTITIES AND TAGS FOR NATURAL LANGUAGE SEARCH QUERY PROCESSING

BACKGROUND

Search in database environments has conventionally been performed using structured search paradigms, either with precise syntax in a query language, or with graphical tools such as drop-down menus and input boxes for specific atomic entities. Meanwhile, technologies for natural language processing (NLP) have advanced, using constructs such as named entities. Available general-purpose libraries of named entities can be unsuitable for a customized database environment, for reasons of lacking the terminology of a particular database environment, or not being effectively linked with the underlying database. One alternative to a general-purpose named entity library is to set up a new named entity library for each database installation. Some approaches rely on domain experts—such approaches can be tedious and inefficient when replicated for each separate database installation. Other approaches can employ machine learning—such approaches can require developing a corpus of training data for each database installation. These approaches often yield brittle named entity libraries that function well in one knowledge domain or database environment, but only poorly in other superficially-similar knowledge domains or database environments. As the conventional approaches have not been satisfactory, there remains a need for improved technology for customized NLP, in database environments and other applications.

SUMMARY

In summary, the detailed description is directed to various innovative technologies for natural language query processing using custom named entities. Examples of the disclosed technologies can obtain custom named entities from a structured search model associated with a database environment or from the database environment itself, can attach unique identifiers to the custom named entities, and can augment named entities with tags. Other examples of the disclosed technologies can process tokens from a natural language query, identify matching named entities (e.g., from a library of custom named entities for a database environment and potentially from other, predefined named entities), and build compound entities, with which a structured search representation of the natural language query can be formed. The structured search representation, which is built using the natural language query, can then be used in a database environment to precisely or efficiently locate or retrieve desired records from the database environment. Custom named entities can be accurately targeted to the database environment, allowing the disclosed technologies to outperform conventional technologies over a wide range of customized environments. With disclosed technologies, database queries can be easily and efficiently performed by personnel lacking the training to implement structured search queries, thereby advancing the art of database query technology.

In certain examples, the disclosed technologies can be implemented as a method of building a custom named entity library for a database environment. For example, a plurality of custom entities are extracted from a structured search model for the database environment. For each of the plurality of custom entities, a library record is formed and stored in the custom named entity library. The library record associates the custom entity with one or more database unique identifiers and one or more tags.

In some examples, the structured search model can include searchable labels and data objects associated with the database environment. The database environment can support structured searches based on the structured search model. The custom entities can include one or more types such as: a logical data object type, a table attribute type, a table attribute variant type, a freestyle type, or a domain value type. The custom entities of the custom named entity library can include all of these types. A given custom entity can be a table attribute type and can have multiple words, a given one of which can be identified as a head of the given custom entity. Another library record can be formed, with the given word as a custom entity of a table attribute variant type. A given custom entity can be associated with a corresponding table attribute of the database environment. Values of the corresponding table attribute can be determined to have an enumerated datatype. Domain values of the enumerated datatype can be identified from a data structure of the database environment, and respective additional library records can be formed for the identified domain values as additional custom entities of a domain value type. In further examples, the domain values can be unavailable in the structured search model.

In further examples, a given custom entity can be associated with at least two of the database unique identifiers, which can include a first identifier corresponding to a table attribute of a table of the database environment, and a second identifier corresponding to a data object associated with the table. A tag can have a tag key and a tag value. The tag key can be selected from: semantics tag, datatype tag, measure unit tag, currency unit tag, or length tag.

In certain examples, the disclosed technologies can be implemented as a method of building one or more structured search descriptors from a natural language query on a database environment. For example, the natural language query is received and tokenized into multiple tokens. For a first sequence of at least some of the tokens, one or more custom entities are identified from a custom named entity library of the database environment. One or more compound entities are built from the identified at least one custom entity and one or more other tokens.

In some examples, the compound entities can include an entity value pair. The entity value pair can incorporate a given one of the custom entities and a corresponding value. The value can be a predefined entity represented by a second sequence of one or more other tokens distinct from the first sequence of tokens. The predefined entity can have tags that are compatible with the tags of the given custom entity. Alternatively, the value can be a second custom entity represented by a third sequence of one or more tokens distinct from the first sequence of tokens. The second custom entity can have database unique identifiers that are compatible with the database unique identifiers of the given custom entity.

In further examples, the compound entities can include an entity lookup pair. The entity lookup pair can incorporate a given one of the custom entities and a corresponding token sequence. The corresponding token sequence can by an open-class part of speech formed by a second token sequence near the first token sequence.

In additional examples, a branch can be built. The branch can include a given one of the compound entities, and can span the received natural language query. Additional distinct branches can be built, each spanning the natural language query. Two of the branches can correspond to respective logical data objects.

In certain examples, the disclosed technologies can be implemented as computer-readable media storing instructions which, when executed by one or more hardware processors, cause the one or more hardware processors to perform certain operations. For example, a customized named entity data structure for a database environment is configured according to the operations. Custom entities are extracted from a search model for the database environment and stored in the customized named entity data structure, along with associated database unique identifiers. In response to input of a natural language query, one or more custom entities from the customized named entity data structure are matched to one or more sequences of tokens derived from the natural language query. One or more structured search descriptors are built. The descriptor(s) specify the associated database unique identifiers of the matched one or more custom entities. In some examples, the operations can also include receiving the tokens from a query preprocessor.

The innovative technologies described herein can be implemented as part of a method, as part of an NLP apparatus or system configured to perform the method, or as part of non-transitory computer-readable media storing computer-executable instructions for causing one or more processors in a computer system to perform the method. The various innovative technologies can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Overview

Figure 1:
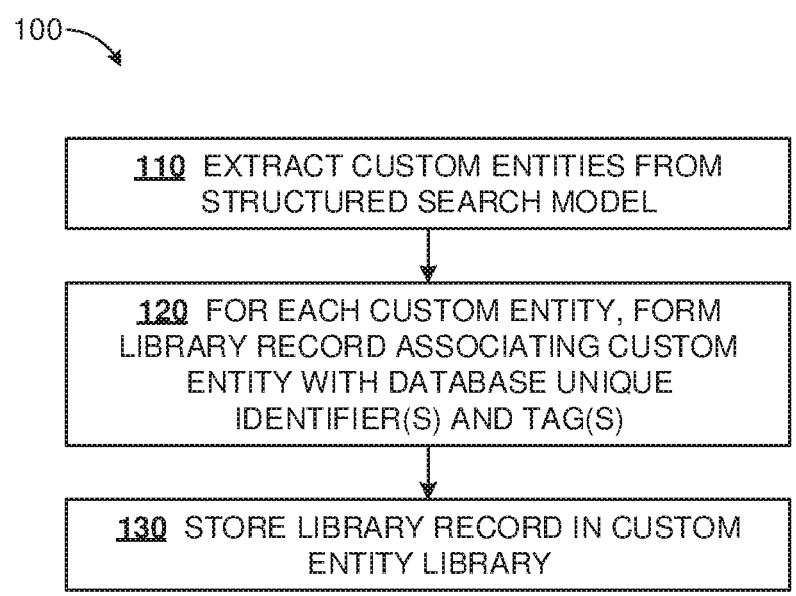
FIG. 1 is a flowchart of a first example method for building a library of custom named entities according to the disclosed technologies.

Search is an important function in many database environments. Structured search, such as with SQL or another formal programming language, has been widely used but can be cumbersome for development of queries. By using language communication skills natural to humans, natural language search queries have the potential to alleviate the query development bottleneck. However, natural language queries can suffer from various inefficiencies. First, without suitable preparation, natural language queries can map inefficiently to the specialized terminology of a typical database environment. Second, a brute force search of keywords from a natural query can require substantial computer resources on even a mid-size database, let alone increasingly common petabyte databases or a few extant exabyte databases. Thirdly, developing customized libraries individually for respective database deployments can be inefficient with conventional technology. The technologies disclosed herein can overcome problems such as these, enabling efficient deployment of natural language search, at scale, in customized database environments.

Some examples of the present disclosure are directed to transforming a natural language query into a structured search descriptor. The disclosed technologies solve the mapping problems through the use of named entities, and further use compound entities to provide search descriptors that can be more efficiently executed by a structured search engine. Moreover, the disclosed technologies can be deployed for a specific, customized database environment with minimal additional engineering effort, allowing easy deployment across large numbers of customized database environments.

Examples of the disclosed technologies can be implemented at configuration time and/or at search time. At configuration time, one or more named entity libraries can be built. Custom named entities can be extracted from a pre-existing search model that may already exist to support structured search on the database environment. Because the search model is already linked to specific objects within the database environment, the extracted named entities can be precisely targeted to respective specific objects, providing an efficient mapping from the custom named entities to the database environment. Additionally, predefined entities can be imported from publicly available libraries for a variety of common terms including, without limitation, numbers, locations, measurement quantities, currency quantities, or colors. Predefined entities can also be provided for relational operators.

Then, at search time, a natural language input query can be parsed and mapped to the custom and/or predefined entity libraries. In this way, a natural language query can be efficiently mapped to specific objects in the database environment. For additional efficiency, compound entities can be recognized. Custom entities and compound entities can be efficiently used as descriptors for structured search tools, or can be built into so-called branches that can provide complete search descriptors for an entire natural language query. One type of compound entity pairs a custom named entity with a corresponding value, leading to a more efficient structured search as compared with searching the custom entity and the value separately.

Other aspects of the disclosed technologies include variants and domain values. As the term suggests, variants allow recognition of query terms that can deviate from the precise labels extracted from a search model. Domain values refer to a finite set of permitted values of an enumerated variable in a database environment. In some examples of the disclosed technologies, domain values can selectively be promoted to custom entities, allowing for additional search efficiencies.

The above and additional aspects of the disclosed technologies are described herein.

Terminology

A "branch" is a structured search descriptor that spans a natural language query.

A "currency unit" is a tag key that identifies a named entity as a unit of currency. A currency unit tag can have a tag value such as euros, dollars, francs, rupees, and so forth.

A "database unique identifier" (DUI) is a unique identifier of an entity in a database environment. Commonly, tables, columns, and logical data objects can have DUIs, however DUIs are not limited to such entities. Tables and columns can have DUIs of a table attribute identifier type (sometimes, table attribute ID), while logical data objects (LDOs) can have a DUI of an LDO identifier type (sometimes, LDO ID). A search model can also have a DUI, of model identifier type (sometimes, model ID). In some examples, rows, domain values, or relationships of the database environment can also have DUIs. A DUI can be identical to the identifier used within the database environment to identify and link columns, for example, or it can be a different identifier specific to a search model or the disclosed technologies. In examples, a DUI can be implemented as a 32-bit, 64-bit, 128-bit, or 256-bit value, and can be represented with or without formatting, such as in dotted decimal or hexadecimal notation.

A "database environment" or "database system" (sometimes, "database" for short) is an organized collection of data maintained on computer-readable media and accessible by execution of instructions at one or more processors. Databases can be relational, in-memory or on disk, hierarchical or non-hierarchical, or any other type of database. A database can store an original or master copy of one or more data items.

A "datatype" is a definition or specification of a type of data object. A datatype can be simple or primitive, meaning that it is not composed of smaller entities. Logical or Boolean variables, integers, and floating point variables are primitive datatypes in many computer languages. Likewise, many computer languages have either characters or strings as primitive datatypes. Complex datatypes can be composed of smaller entities, which can be simple datatypes or other complex datatypes. A complex datatype can be organized as a collection of fields, each field having a role within the complex datatype. Tags can be used to indicate the datatype of a table attribute, with the tag-key "datatype tag" or simply "datatype".

A "domain value" refers to one possible value of an enumerated datatype or variable. A domain value can be formed into a custom named entity of Domain Value type. In some examples, some predefined named entities can also be of Domain Value type.

An "entity lookup pair" is a compound entity formed as a pair of a custom entity and a token sequence. The token sequence can be proximate to the custom entity within the text of a natural language search query, and can represent an open-class part of speech. An entity lookup pair can be denoted as ⟨Custom Entity, Token Sequence⟩. In some examples, the custom entity in an entity lookup pair can be among the following types: Table Attribute Label, Table Attribute Variant, LDO Label, or LDO Variant.

An "entity value pair" is a compound entity formed as a pair of a custom entity and a value. The value can be a predefined entity, or another token sequence. The entity value pair can be denoted as ⟨Custom Entity, Value⟩, ⟨Custom Entity, Predefined Entity⟩, or ⟨Custom Entity, Token Sequence⟩. In some examples, the custom entity in an entity value pair can be among the following types: Table Attribute Label, Table Attribute Variant, LDO Label, or LDO Variant.

An "enumerated" datatype or variable is one that is limited to a predetermined finite set of values. The values can be numerical, string, tuples, or more complex data structures. The terms "categorical" datatype or variable can be used synonymously. Blood type, letter grade, country name, or postal code can all be regarded as enumerated variables having respective enumerated datatypes. The finite set of values is dubbed a "domain", and each of the values is a "domain value". The domain for a table column can be specified with a tag having tag-key "datatype tag" or simply "datatype". A domain can also have a DUI of type "domain identifier" or simply "domain ID".

A "freestyle" named entity refers to a named entity that is not part of a compound entity. A freestyle named entity can be either a custom entity or a predefined entity. The term "freestyle" can also refer to a token or sequence of tokens that is neither a custom entity nor a predefined entity.

A "label" is a text identifier of an object in a database environment. Unlike a DUI, a label need not be unique. To illustrate, an Employee table and a Product table can both have columns labeled "Name," but these are different and have different DUIs. Labels can be case-sensitive or case-insensitive.

A "logical data object" (LDO) is a collection of data together with associated methods. That is, the word "object" in LDO has a similar connotation as in object-oriented programming, where data is packaged with methods to support, among other features, data hiding. From another perspective, an LDO presents data items in terms of functions supported by the LDO. Access to LDO data items can be performed through the LDO's own access methods rather than through detailed knowledge of underlying relational databases or data structures. In some examples, languages such as ABAP or Java may be used to interface with the LDO's access methods, while the LDO's access methods can be implemented internally with SQL statements. The data of an LDO can be organized within a relational database, another database or data structure, or as documents in a document management system, in any combination. LDOs also differ from classical objects of object-oriented programs in important ways. For example, an LDO exists as a stand-alone entity, and is not limited by the scope or lifetime of a particular software program. Further, two LDOs can share some of the same data. An LDO can be defined according to a schema, or can be dynamically extended. For example, storing a new input data value in an LDO can involve extension of the LDO. An LDO can have a label, such as "Product Documentation", which can be extracted as a custom named entity of LDO Label type. A variant of this label, such as "Documentation", can be extracted as a custom entity of LDO Variant type.

A "measure unit" is a tag key that identifies a named entity as a unit of measure. A measure unit tag can have a tag value such as degree Celsius, gram, hour, meter, ohm, pascal, volt, and so forth.

A "named entity" is a term of art referring to a word or sequence of words having a specific meaning in a knowledge domain. Knowledge domains of interest in this disclosure include database environments and, particularly, customized database environments. Aspects of this disclosure are directed to efficient use of named entities for natural language processing of queries in a database environment. A named entity having a specific meaning does not preclude it from having additional distinct specific meanings in the same knowledge domain. That is, multiple named entities in a given knowledge domain (or, database environment) can be represented by the same text. Two species of named entities are described herein. Some named entities can be general purpose, and can be obtained from publicly available libraries—these are dubbed "predefined named entities" or simply "predefined entities" herein. Examples of predefined entities include lists of countries, cities, or numbers expressed as words (e.g. "two" or "hundred"). Other entities can be identified specifically for a particular knowledge domain or database environment, and are dubbed "custom named entities" or simply "custom entities" herein. Named entities can be aggregated with other named entities or tokens into "compound entities," and unaggregated named entities can be dubbed "freestyle" entities. A freestyle named entity refers to a named entity that is not part of a compound entity. A freestyle entity can be either a custom entity or a predefined entity. Other uses of the word "entity" are according to its plain English meaning.

A "natural language" is a form of encoded communication among humans that has evolved through spoken or written usage over time. Thus, natural languages are distinguished from computer programming languages, constructed languages such as Esperanto, codes such a Morse code, or machine-to-machine communication codes such as used for telephony, data communication, or wireless communication. Arabic, Bengali, Chinese (e.g., Mandarin), English, French, German, Hausa, Hindi, Japanese, Korean, Malay, Persian, Portuguese, Quechua, Russian, Spanish, in their various regional variations and dialects, are all natural languages, along with a multitude of other well-known and less common languages. While examples of natural language text in this disclosure are in the form of written words, this is not a requirement—a natural language query can be input as speech and converted to text, for processing in some of the disclosed methods. The term natural language also does not preclude rendering or representing a natural language message by electronic means, such as entry at a keyboard, storage as an ASCII or Unicode character set, display on a computer monitor, or rendition to speech by a text-to-speech device. The field of processing natural language by software on a computer is commonly referred to as "natural language processing".

An "object", in the context of a database environment or a search model, can refer to any data object, such as a table, column, row, field, LDO, or a data structure. An object can also be a method of an LDO or metadata. A "data object" is a structured or unstructured collection of data, and can be just a single data item. Generally, data objects themselves are not named entities, however each such data object can have a label which can be a named entity (usually, a custom entity). Likewise, a custom entity is a label which can identify an object in a database environment, however the custom entity by itself is generally not a data object.

The term "open-class" refers to a part of speech whose set of members can be easily extended. Open-class parts of speech are commonly regarded as nouns, verbs, adjectives, and adverbs.

A "part of speech" is a class of a word or phrase that denotes the syntactic function of the word or phrase. In English language, common parts of speech include adjective, adverb, conjunction, interjection, determiner, noun, preposition, pronoun, and verb.

A "query" is request for information, such as information contained within a database environment. Some queries of interest in this disclosure are "natural language queries" which can be in the form of a body of text. Although a natural language query can be a syntactically correct, complete sentence, formed as a question, none of these (correct syntax, complete sentence, formed as a question) is a requirement. A natural language query can be a sequence of tokens that is not formed as a question, is not a complete sentence, or violates syntax rules of its natural language. For example, "product serial numbers rejected in testing" or "packages not delivered" can be acceptable natural language queries.

A "relational operator" (sometimes, simply "operator") is a predefined entity specifying a relationship between two token sequences or named entities of a natural language query. Relational operators can be symbolic (e.g. ">", "≤", "=") or expressed in words (e.g. "greater than", "at most", "is"). In some examples, relational operators can be prepositions or prepositional phrases (e.g. "before", "in", "not").

A "request" is a message to which a substantive response is expected, that is, a response beyond an acknowledgment. In contrast, a "notification" need not receive a substantive response.

A representation of a body of text is said to "span" the input text if all tokens of the input text, except those tokens belonging to some disregarded classes of tokens, are accounted for in the representation. The representation can be in the form of text, but this is not a requirement. Representations can be in the form of a graph, such as a syntax tree, or can include one or more DUIs.

A "store" or "repository" is a data storage entity. The term store can be qualified by a type of data stored therein.

The term "structured search" refers to a conventional way of searching in a database environment. Structured search can include queries in a programming language, such as SQL or ABAP, or graphically with menus, data filters, and/or input text boxes for specific atomic objects. A common feature of structured search is that a certain level of skill is required on the part of a user, as regards organization of the database environment, a query language, or graphical query tools. In contrast, natural language queries can commonly be performed with a lesser knowledge of the database environment, and with no knowledge of any computer query language or graphical query tools. Natural language queries are not structured search queries.

A "structured search model", or "search model" for short, is a store containing descriptions of LDOs, database tables, and related objects prepared for structured search of a database environment. A search model can include a description or labels of LDO structure, table organization; searchable attributes of tables, LDOs or other objects of the database environment; and/or authorization restrictions.

A "table" is a two-dimensional array organized into rows (e.g. records) and columns (e.g. fields). Commonly, a row can be a record pertaining to an instance of some class of objects represented in the table, and a column can pertain to a particular property of those objects. A field at the k-th column of the m-th row can store a value of the k-th property for the m-th object. However, while such table organization can be useful for illustration, it is not a requirement of the disclosed technologies, and other organizations and representations can be used. A table can be a database table in a database environment, and can have relational links, such as shared columns, with other tables. In examples, a table can be a row store table accessed through an associated index structure or a column store table.

A "table attribute" can be any attribute or property of a table, including a column, a row, a relationship, or the table itself. A table attribute can have a label, such as a descriptive label "City of Departure", which can be extracted as a custom entity of Table Attribute Label type. A variant of the label (e.g. "City") can be generated as a custom entity of Table Attribute Variant type. For a given table attribute, the label in the search model can be the same as the label in the database environment, however this is not a requirement. In some examples, the search model can override the database environment label with a different label. As an illustration, a database environment can use labels "City-From" and "City-To" and, for clarity, these can be replaced with "City of Departure" and "City of Arrival", respectively, in the search model.

A "tag" is an attribute of a named entity. Commonly, a custom named entity can have one or more tags. In some examples, predefined named entities can also have one or more tags. A tag can be represented as a pair of a tag-key and a tag-value, with the tag-key indicating the attribute to which the tag pertains, and the tag-value indicating the value of that attribute. In some examples, DUIs can be treated as one or more types of tag.

A "token" is an atomic component of a body of text. Commonly, a token can be a word. The body of text can be an input query in a natural language, which can be free form text, with or without punctuation.

A "token sequence" is an ordered sequence of one or more tokens. In some examples, token sequences can be limited to sequences having no gaps, while in other examples a token sequence can be formed after disregarded tokens have been removed. In further examples, token sequences can be limited to groups of one or more tokens forming a connected subgraph within a syntax tree of the underlying body of text.

The term "tracing" refers to an operation of searching backwards from a custom entity or other object to identify its source or other related objects. For example, a custom entity obtained from a search model can be traced to a column of a table in a database environment.

A "tuple" is an ordered collection of two or more member data items. The members of a tuple can have same or different datatypes, which can be atomic or complex. A "pair" is a tuple with two members and a "triple" is a tuple with three members. A counterpart to a tuple, having a single member, is a "singlet," which is not a tuple.

A "variant" is an alternative form of a custom entity. Often, a custom entity can be a phrase (e.g. "city of departure"). Grammatical analysis of this phrase can identify it as a noun phrase, with "of departure" qualifying "city". Accordingly, "city" can be identified as the head of this phrase, and can be used as a variant for the original custom entity "city of departure". As a practical matter, this provision allows a query that merely specifies "city" without the word "departure" to be recognized as possibly intending to query "city of departure". That is, the use of a head as a variant allows permissive interpretation of a query. A variant can be an alternative to multiple custom entities. For example, "city" can also be a variant for "capital city" or "arrival city" or "nearest city". Accordingly, a custom entity library can have four custom entity records, all of a Table Attribute Variant type, all with identical text strings "city". In this way, a user query of "city" without further qualification can pick up any of the likely intents.

A "word" is a sequence of consecutive characters from a predetermined alphabet. Commonly, the predetermined alphabet in English includes lower-case and upper-case letters. Other languages can have similar alphabets, and some can include character modifiers and modified character forms. Often, the predetermined alphabet can include numerals (0-9) or certain punctuation marks (e.g. "_", "-", "$", "#", "+", "=", ">", "<", or "/") while excluding other punctuation marks (e.g. ",", ";", ":", ".", "?", "!") which, along with whitespace, can be treated as delimiters.

First Example Method for Building a Custom Entity Library

FIG. 1 is a flowchart 100 of a first example method for building a custom entity library according to the disclosed technologies. A structured search model serves as a resource from which custom entities are extracted. Records are formed from the custom entities, their associated DUIs, and tags. The records are stored in a custom entity library, which can be used subsequently for processing natural language queries.

At process block 110, custom entities can be extracted from a structured search model. The structured search model can be a customized data store designed to support structured search in a particular database environment, and can include labels or descriptions of LDOs, tables, table attributes and other objects of the database environment. The custom entities extracted at block 110 can include labels of various entities present in the database environment, including without limitation: table columns, tables, table rows, or LDOs. In some examples, the extracted labels can be limited to searchable labels of a structured search application, while in other examples, the extracted labels can include labels not supported by the structure search.

At process block 120, a library record can be formed for each of the custom entities extracted at process block 110. The library record can associate the custom entity with one or more DUIs and one or more tags. To illustrate, a custom entity that is a label of a table column can have the DUI for that column, and optionally a DUI for an LDO of which the table is a part, or a DUI of a search model version. The custom entity record can include tags such as datatype tags, length tags, or semantic tags, which can be inferred variously from the search model, the database environment, or the custom entity string itself.

Because labels used within a database environment need not be unique, in some scenarios multiple library records can be formed for different custom entities having identical labels. Ultimately, the DUI is the arbiter for determining whether two labels pertain to the same named entity (e.g. associated DUIs are the same) or different named entities (e.g. associated DUIs are different). In some examples, the labels can be standardized at block 110, by case conversion to upper, lower, or title case, by detection and elimination of spelling errors, by standardization of inconsistent hyphenation, or by similar transformations.

Then, at process block 130, the library records can be stored to a custom entity library, which can be available as a resource for subsequent processing of natural language queries. The library can be variously stored in-memory, in a local or remote database, as a disk file, or in the cloud. In some examples, the custom entity library can be created anew through the method of flowchart 100, while in other examples, the library records stored at block 130 can update or overwrite existing records of a pre-existing named entity library, or append new records to the pre-existing library.

While process blocks 110, 120, 130 are depicted in sequence for convenience of illustration, this is not a requirement. Process blocks 110, 120, 130 can variously be performed for one custom entity at a time, in tandem, in a pipeline, or in batches. In some examples, a given custom entity can be extracted, augmented to form a library record, and stored to the library before processing a next custom entity. In other examples, augmenting a first custom entity can be performed in parallel with extracting a second custom entity.

The custom entities can be classified in various types including LDO Label type or Table Attribute Label type. The library record for a custom entity can include a field specifying the type of an instant custom entity. Records of other types of custom entities can also be generated and included in a custom entity library, such as Domain Value type or a Variant type.

Variant types can be derived by grammar analysis of a label, to identify a head word. To illustrate, the head of "date of notification" can be resolved to the noun "date". Thus, "date of notification" can have a custom entity of type Table Attribute Label, and a distinct custom entity for "date" can be generated, of type Table Attribute Variant. Often, a head can be a noun within a label that is a noun phrase. In some examples, a head can be permitted to be two or more words of a label, which can be identified from a dictionary of phrases, such as "traffic light" or "washing machine." In further examples, additional variants can be generated as synonyms of a label or of a head, which can be mapped from a thesaurus. LDO Label custom entities can also be analyzed to obtain custom entities of LDO Variant type.

Example Method for Processing a Custom Entity of Domain Value Type

Figure 2:
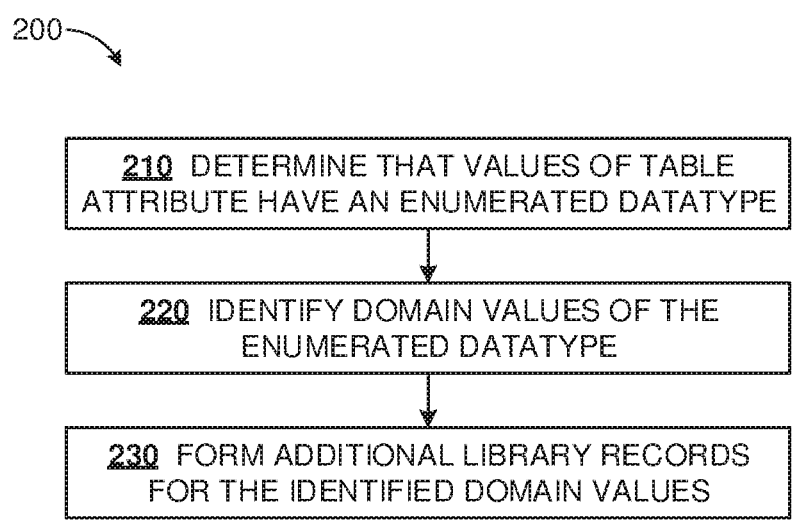
FIG. 2 is a flowchart of an example method for processing a custom named entity of domain value type, according to the disclosed technologies.

Custom entities of a Domain Value type can be derived for certain columns of database tables that have enumerated datatypes. FIG. 2 is a flowchart 200 of an example method for processing a custom entity of Domain Value type.

At process block 210, the table attribute (e.g. a column, corresponding to a of Table Attribute Label custom entity) can be determined to have an enumerated datatype. In some examples, the table attribute can be identified by tracing a corresponding custom entity, previously extracted from a search model, back to the database. In other examples, the table attribute can be identified by scanning tables and columns of the database environment directly, bypassing the search model. For example, a table attribute labeled "Delivery Status" can support a finite set of values such as "Delivered", "Not Delivered", or "Out for Delivery". The determination that this column has an enumerated datatype can be made by inspection of the datatype specified for the particular table attribute.

At process block 220, the domain values of the enumerated datatype can be identified. In some examples, the domain values can be found within the structured search model, while in other examples can be unavailable in the search model, but can be retrieved by tracing properties of e.g. a column within the database environment. In some instances, the domain values can be maintained in an auxiliary table within the database environment, and can be imported directly from there.

One or more of the identified domain values can be designated as custom entities of type Domain Value, and corresponding library records can be created for these domain values. In some scenarios, all the domain values of the enumerated datatype can be incorporated into the custom entity library, while in other scenarios only a selected subset of the domain values can be retained. A decision of which strategy to follow can be controlled by software flags, and can be based partly on express or inferred properties of the relevant Table Attribute Label custom entity, the number of domain values, or on relative frequencies of the domain values. To illustrate, a "Country" column can have around $10^2$ domain values, of which only about 20 have usage above a threshold. These 20 can be kept as custom entities, to provide efficient subsequent searches, and the remaining Country values can be omitted, sacrificing efficient searches for infrequent queries in favor of keeping the custom entity library compact.

At process block 230, additional library records can be formed respective domain values identified at block 220, with optional DUIs or tags as described herein. These library records can be stored in a custom entity library. In some examples, the custom entity library can be organized by class of custom entity, or respective libraries can be maintained for different entity classes.

Second Example Method for Building a Custom Entity Library

Figure 3:
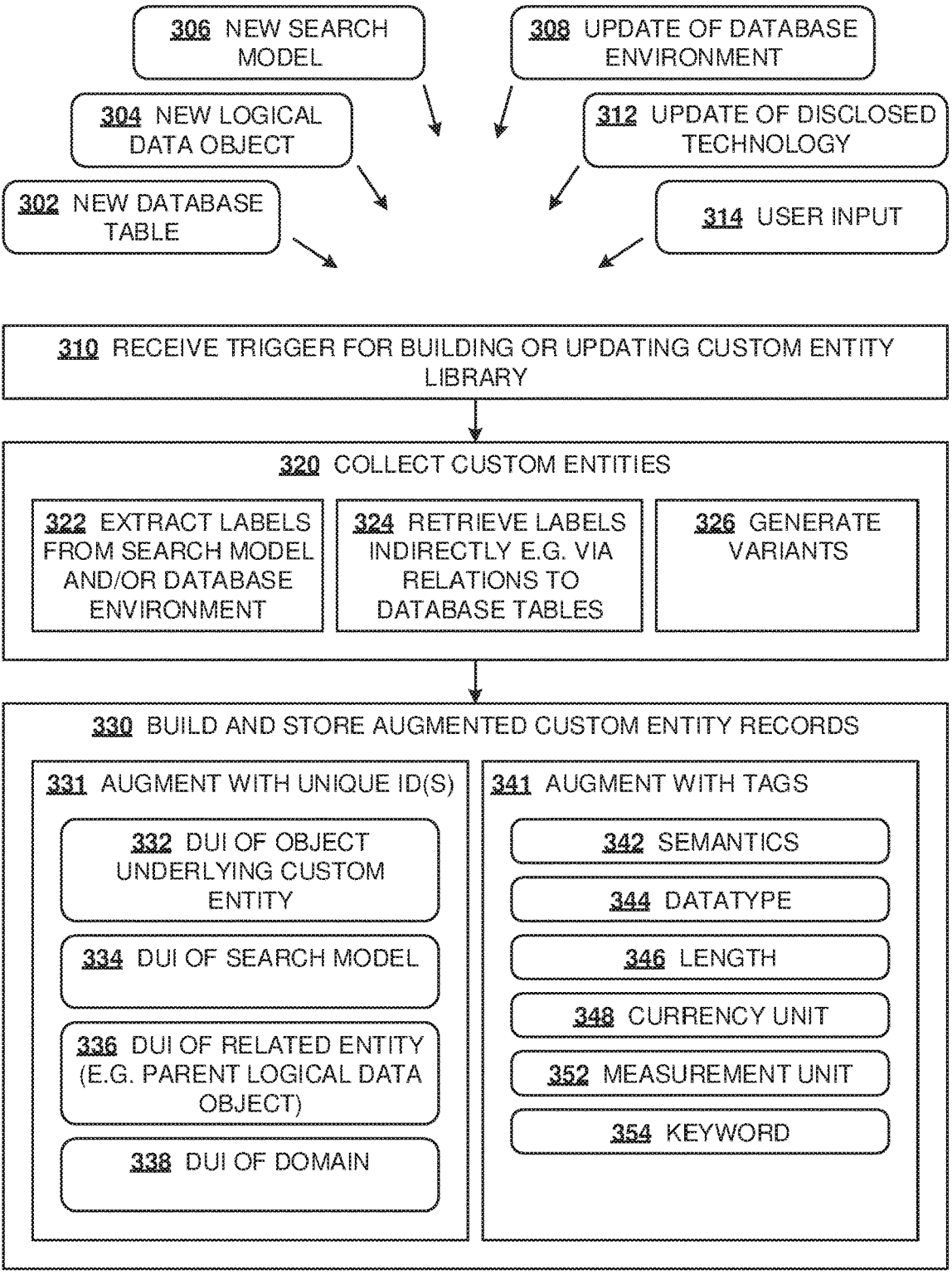
FIG. 3 is a flowchart of a second example method for building a library of custom named entities according to the disclosed technologies.

FIG. 3 is a flowchart 300 of a second example method for building a custom entity library according to the disclosed technologies. This method performs operations to generate or modify a custom entity library in various use cases. Thus, the illustration of various options in FIG. 3 does not imply that all illustrated options be implemented or performed in a given use case or embodiment, nor does it preclude additional options from being used. In examples, the method can be performed by a computer system in a datacenter or cloud environment. The method can be managed by a proprietor of a database environment or by a service provider.

At process block 310, a trigger is received to initiate operations to build or update one or more custom entity libraries. The trigger can be in the form of a user input 314 or another event. Some events which can trigger operations are illustrated in FIG. 3 and include a new database table (302), a new LDO (304), or another update of the database environment (308). Other events that can trigger operations on the custom entity library include a new or updated search model (306) or an update to the disclosed technology (312) for building or managing custom entity libraries. For example, a technology update could add, split, or consolidate tag keys, or introduce support for a new type of custom entity. Any of these, or other events, can cause a trigger to be received at process block 310. In some examples, flowchart 300 can be triggered automatically upon creation, modification, or update of a database table or search model.

At process block 320, custom entities can be collected. At sub-block 322, labels can be extracted from a search model, from database tables, and/or from other entities of a database environment. At sub-block 324, labels can be retrieved indirectly. As an illustration, a column label in a search model can be traced back to its associated column in the database environment, and traced further from the column to its defined domain values. At sub-block 326, variants can be generated. Details of some of these sub-blocks are described further elsewhere herein.

At process block 330, custom entity records, variously augmented by DUIs (sub-block 331) or tags (sub-block 341), can be built and stored. As described herein and illustrated in FIG. 3, the custom entity can be attached or linked to a DUI of the object underlying the custom entity (332), that is, a custom entity which is a label of a table attribute can be linked to the DUI of that table attribute. Other DUIs that can be attached or linked to the custom entity include a DUI of the search model (334), or a DUI of another related object (336) such as a parent LDO or a domain (338). Further, some of the tags which can be attached or linked to a custom entity include tags for semantics (342), datatype (344), length (346), currency unit (348), measurement unit (352), or keyword (354). Details of these DUIs and tags are described further elsewhere herein.

Similar to FIG. 1, the process blocks 320, 330 can be performed separately for each custom entity or group of custom entities, in a pipeline, or in another ordering.

Example Method for Processing a Natural Language Query

Figure 4:
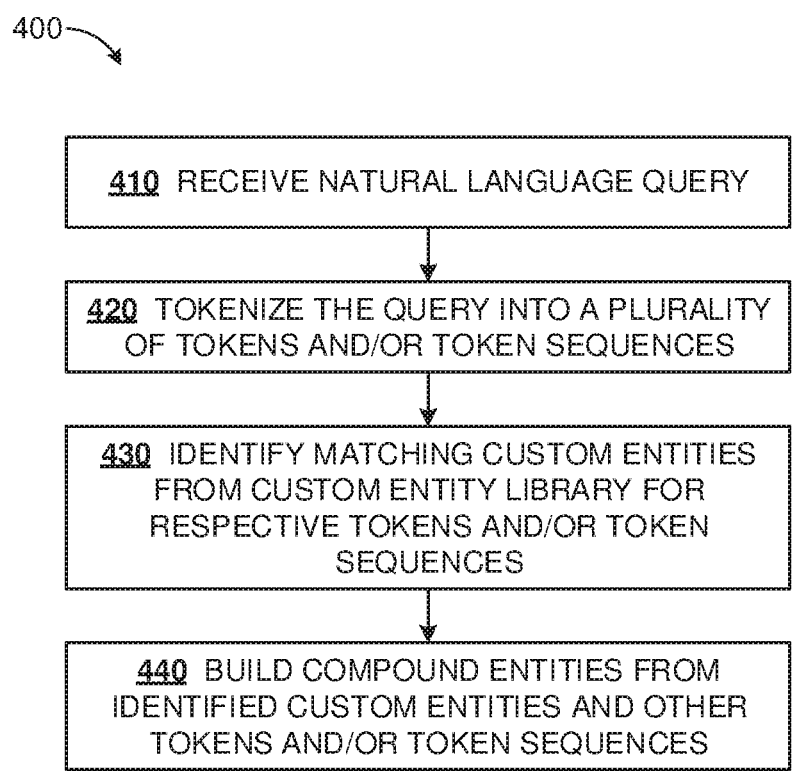
FIG. 4 is a flowchart of a first example method for processing a natural language query according to the disclosed technologies.

FIG. 4 is a flowchart 400 of a first example method for processing a natural language query to obtain one or more structured search descriptors. In this method, custom entities and compound entities are built based on a natural language query.

At process block 410, a natural language query can be received. Example queries could be "product weight 3 kg" or "show orders with delivery status not delivered". At process block 420, the query can be tokenized to obtain a plurality of tokens or token sequences. "Product", "weight", "3", and "kg" are examples of tokens. Token sequences can include the single tokens, and longer sequences such as "product weight" or "3 kg".

At process block 430, custom entities can be identified, from a custom entity library, for respective tokens or sequences obtained at block 420. As examples, "product weight", "delivery status" and "not delivered" can be identified as custom entities.

At process block 440, the identified custom entities can be combined with other tokens or token sequences, including those which can be identified as other custom entities or predefined entities, to form compound entities.

A named entity or a compound entity can include one or more DUIs, and either can itself be used as a structure search descriptor. In some examples, named entities or compound entities can be combined with other tokens or other predefined, custom, or compound entities to obtain a branch that spans the query, and can also be a structured search descriptor. In further examples, multiple distinct branches can be generated for a single query. In some database environments, multiple LDOs can share some tables or some table attributes (e.g. columns). In such cases, a custom entity (e.g. for a shared table attribute) having a particular DUI can be linked to two LDOs having their own, distinct DUIs. This can result in two branches being generated, one for each of the LDOs. In some other cases, two LDOs can have respective table attributes which are distinct from one another but have an identical label. For example, an LDO for Employees and an LDO for Products can both have columns labeled "Name". In such cases, a query token "name" can resolve to two distinct custom entities (each labeled "Name"), and two branches can be generated for the respective custom entities and LDOs.

In some examples, the method of flowchart 400 can be extended to outputting one or more structured search descriptors or branches. The structured search descriptor or branch can be used to perform a structured search on a database environment. Results of the structured search can be stored, presented to a user, or transmitted to a remote client.

Example Method for Building a Compound Entity

Figure 5:
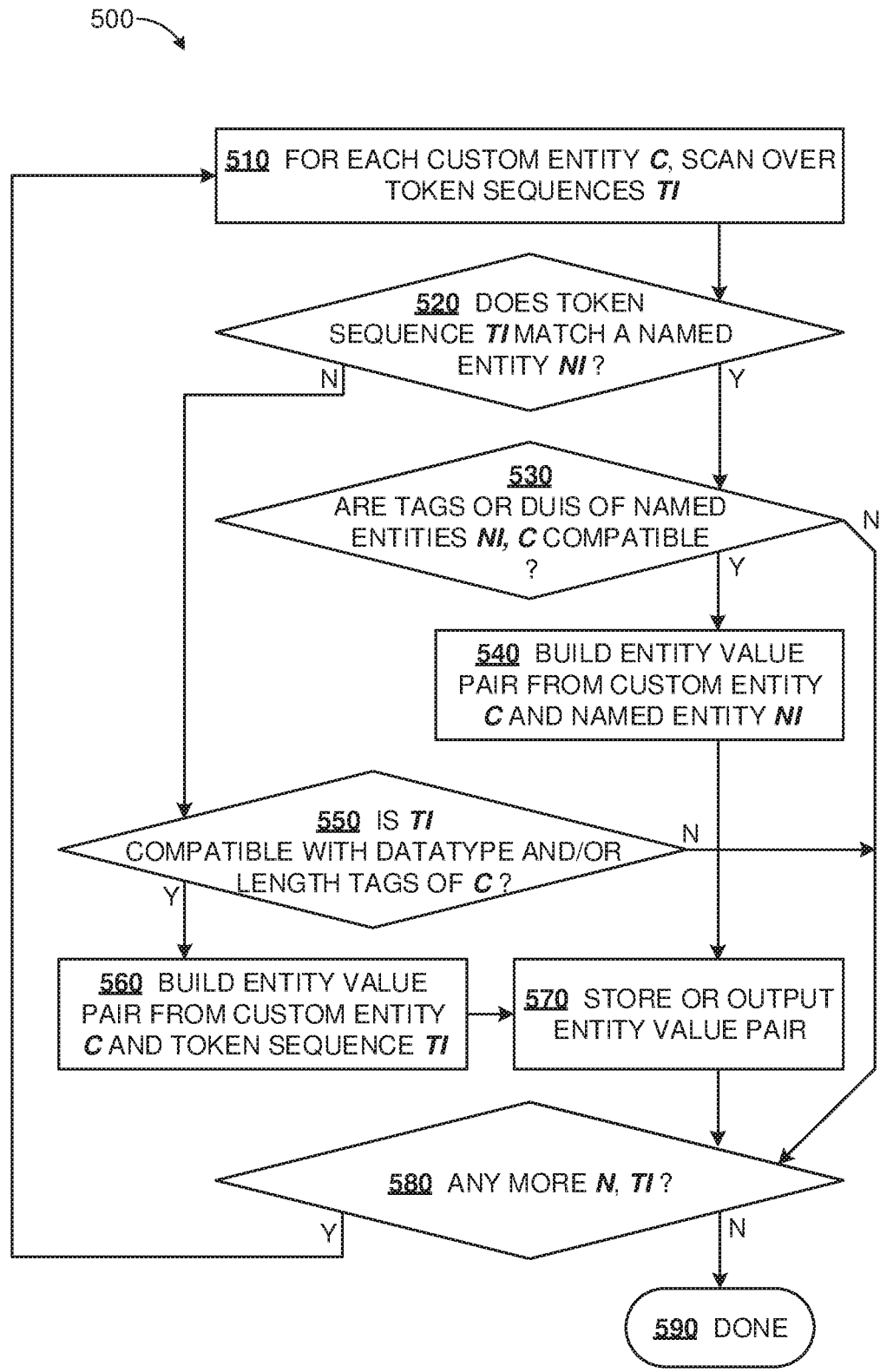
FIG. 5 is a flowchart of a first example method for building a compound entity according to the disclosed technologies.

FIG. 5 is a flowchart 500 of a first example method for building a compound entity according to the disclosed technologies. In this method, a type of compound entity called an entity value pair can be built. In some examples, this or a similar method can be performed as part of block 430 discussed herein.

Process block 510 is the head of a loop performed over custom entities and token sequences, considering those token sequences that are distinct from an instant custom entity. That is, if a query consists of token sequences P, Q, R, the first two of which are identified as custom entities CP, CQ, then the loop of block 510 can be performed over the combinations ⟨CP, Q⟩, ⟨CP, R⟩, ⟨CQ, P⟩, ⟨CQ, R⟩. For each such combination of a custom entity C and a token sequence TI, denoted as ⟨C, TI⟩, the flowchart 500 proceeds to decision block 520 and onward.

At decision block 520, the current token sequence TI can be examined to determine if it corresponds to a named entity. For example, the token sequence "5 kg" can be identified as a predefined entity for a weight measure, or the token sequence "Not Delivered" can be identified as a custom entity of Domain Value type (corresponding to a domain value for a "Delivery Status" column). In such cases, the matching named entity can be denoted NI and the Y branch from block 520 can be followed to process block 530, where tags or DUIs of named entity NI and custom entity C are checked for compatibility. In some examples, compatibility between tags can be based on having at least a first threshold number of matching tags, or at most a second threshold number of mismatched tags. In further examples, compatibility between DUIs can be based on having at least a first threshold number of matching DUIs, or at most a second threshold number of mismatched DUIs. Compatibility of tags or DUIs can be ascribed to the parent named entities or token sequences. For example, if two custom entities have compatible DUIs, the custom entities (or their labels) can be regarded as compatible. If a custom entity and a predefined entity have compatible tags, the custom entity (or its label) and the predefined entity (or its label) can be regarded as compatible.

To illustrate, in a query "weight 5 kg", the custom entity "weight" and the predefined entity "5 kg" can both have a tag such as tag-key="measurement unit" and tag-value="kilogram". The match can be an indication of compatible tags between the custom entity C and the predefined entity NI, leading to a determination Yes at process block 530, leading via the Y branch to process block 540. For the case of query "delivery status not delivered", the custom entity "Delivery Status" and the custom entity "Not Delivered" can both have a shared Domain ID DUI of a "D_Delivery_Status" enumerated datatype. This match can be an indication of compatible DUIs between the two custom entities, leading to a determination Yes at process block 530, also leading via the Y branch to process block 540.

At process block 540, an entity value pair can be built from custom entity C and matching named entity NI. Thereafter, the flowchart 500 can proceed to process block 570, where the entity value pair can be stored, e.g. in a working dataset, used for building branches or other compound entities, or output directly as a structured search descriptor. Then, the flowchart 500 can proceed to decision block 580. If there are additional token sequences TI or additional custom entities C to be scanned, the Y branch from decision block 580 returns to the head of the loop at block 510 to repeat for the next pair ⟨C, TI⟩. If all pairs ⟨C, TI⟩ have been processed, the N branch from block 570 leads to termination 590, and the method is complete.

Turning back to decision block 530, other token sequences, such as "Germany" (from a query "Weight Germany") or "Grade A" (from a "Delivery Status Grade A" query) could lead to a negative result. The former can be identified as a predefined entry (a country), but it has no tags compatible with "Weight", while the latter can be identified as a domain value, but having a different Domain ID DUI than "Delivery Status". In both these cases, block 520 can evaluate to Yes, but block 530 can evaluate to No. The N branch from block 530 leads directly to decision block 580, to continue with the next ⟨C, TI⟩ combination, if any, as described above.

Turning back to decision block 520, the token sequence e.g. "Postal service" or "123.45" can be determined not to be any custom or predefined entity (a determination which can be independent of the custom entity C), following the N branch to block 550. As an illustration, custom entity "Delivery Status" can have a datatype tag with value "string" and a length tag with value 16. "Postal service" can be found compatible with "Delivery status" because its datatype is string and its length is less than the custom entity's length value 16. In this case, a Yes determination at block 550 leads to process block 560 where an entity value pair ⟨"Delivery status", "Postal service"⟩ can be constructed. Among other things, the length check can prevent long token sequences from reaching structured search descriptors, which can lead to inefficient searches with low likelihood of finding a desired result. The flowchart 500 continues to block 570, where the entity value pair can be stored, e.g. in a working dataset, used for building branches or other compound entities, or output directly as a structured search descriptor. Then, the flowchart 500 can proceed to decision block 580, to continue with the next ⟨C, TI⟩ combination, if any, as described above.

However, for the token sequence "123.45", its datatype can be evaluated as floating point number, which can be found incompatible with the string datatype of custom entity "Delivery status". Accordingly, the N branch from block 550 can be followed to decision block 580, to continue with the next ⟨C, TI⟩ combination, if any, as described above.

The compound entity (e.g. entity value pair) can inherit DUIs or tags from a component custom entity. Being unique identifiers of specific entities within a database environment, the DUIs allow entity value pairs to be used as descriptors in subsequent structured searches.

Example Method for Building a Compound Entity

Figure 6:
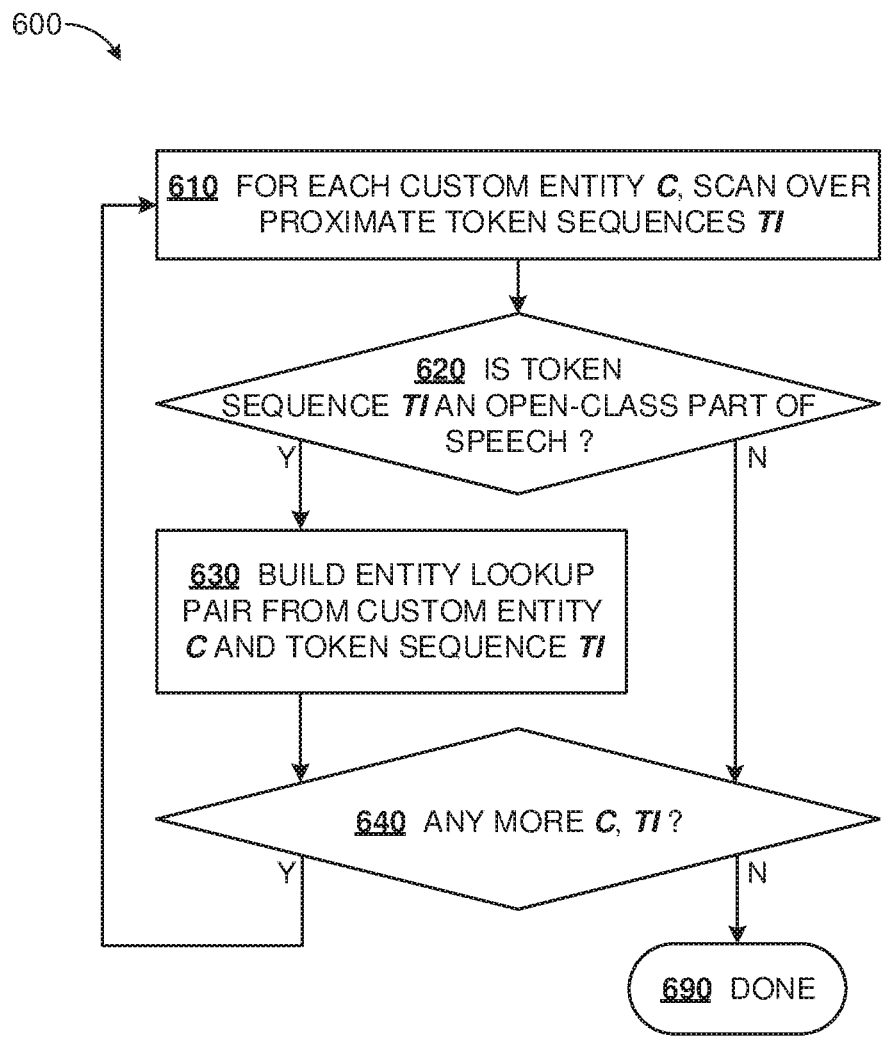
FIG. 6 is a flowchart of a second example method for building a compound entity according to the disclosed technologies.

FIG. 6 is a flowchart 600 of a second example method for building a compound entity according to the disclosed technologies. In this method, a type of compound entity called an entity lookup pair can be built. In some examples, this or a similar method can be performed as part of block 430 discussed herein.

Process block 610 is the head of a loop performed over custom entities and token sequences, considering those token sequences that are proximate to but not overlapping an instant custom entity. If a query consists of consecutive tokens ⟨T1, T2, T3, T4, T5, T6, T7⟩, with ⟨T4, T5⟩ being recognized as a custom entity C45 and T3 being a disregarded token, then token sequences ⟨T6⟩, ⟨T6, T7⟩ can be regarded as adjacent to custom entity N45 on the right hand side, and ⟨T2⟩, ⟨T1, T2⟩ can be regarded as adjacent to custom entity N45 on the left hand side. That is, disregarded tokens such as T3 can be omitted from considerations of proximity in flowchart 600. In some examples, the proximate token sequences of flowchart 600 can be limited to only adjacent token sequences, thus ⟨T1⟩ or ⟨T7⟩ can be excluded from the proximate token sequences of custom entity N45. However, in other examples, a different condition for proximate token sequences can be used. To illustrate, if the test for proximity is "within 2" (adjacency being equivalent to "within 1"), then ⟨T1⟩ or ⟨T7⟩ can be included as proximate to custom entity C45. However, if T5 was also recognized independently as a custom entity C5, then ⟨T2⟩, ⟨T1, T2⟩ would still be "within 2" (T3 being disregarded) of N5, and therefore included as proximate to C5, while ⟨T1⟩ has a distance of 3 from C5 (that is, separated by T2 and T4, with T3 being disregarded) and could be excluded from sequences proximate to C5 (though it would still be proximate to C45 as noted previously). For each such combination of a custom entity C and a proximate token sequence TI, denoted as ⟨C, TI⟩, the flowchart 600 proceeds to decision block 620 and onward.

At decision block 620, the current token sequence TI can be examined to determine if it is an open-class part of speech. To illustrate, a token sequence "number" can be recognized as a noun and hence an open-class part of speech, leading to a determination Yes at block 6. The flowchart 600 follows the Y branch from block 620 to process block 630, where an entity lookup pair can be formed with the current custom entity, i.e. ⟨C, "number"⟩. This entity lookup pair can be collected in a working dataset, used for building branches or other compound entities, or output directly as a structured search descriptor. The flowchart 600 can then proceed to decision block 640. If there are additional token sequences TI or additional custom entities C to be scanned, the Y branch from decision block 640 returns to the head of the loop at block 610 to repeat for the next pair ⟨C, TI⟩. If all pairs ⟨C, TI⟩ have been processed, the N branch from block 640 leads to termination 690, and the method is complete.

Turning back to decision block 620, other token sequences, such as "123.45" or "through" could lead to a negative result, meaning that neither a number nor a preposition is an open-class part of speech. Then, following the N branch from block 620 to decision block 640, the method can continue with the next ⟨C, TI⟩ combination, if any, as described above.

Example Method for Building and Using a Custom Entity Data Structure

Figure 7:
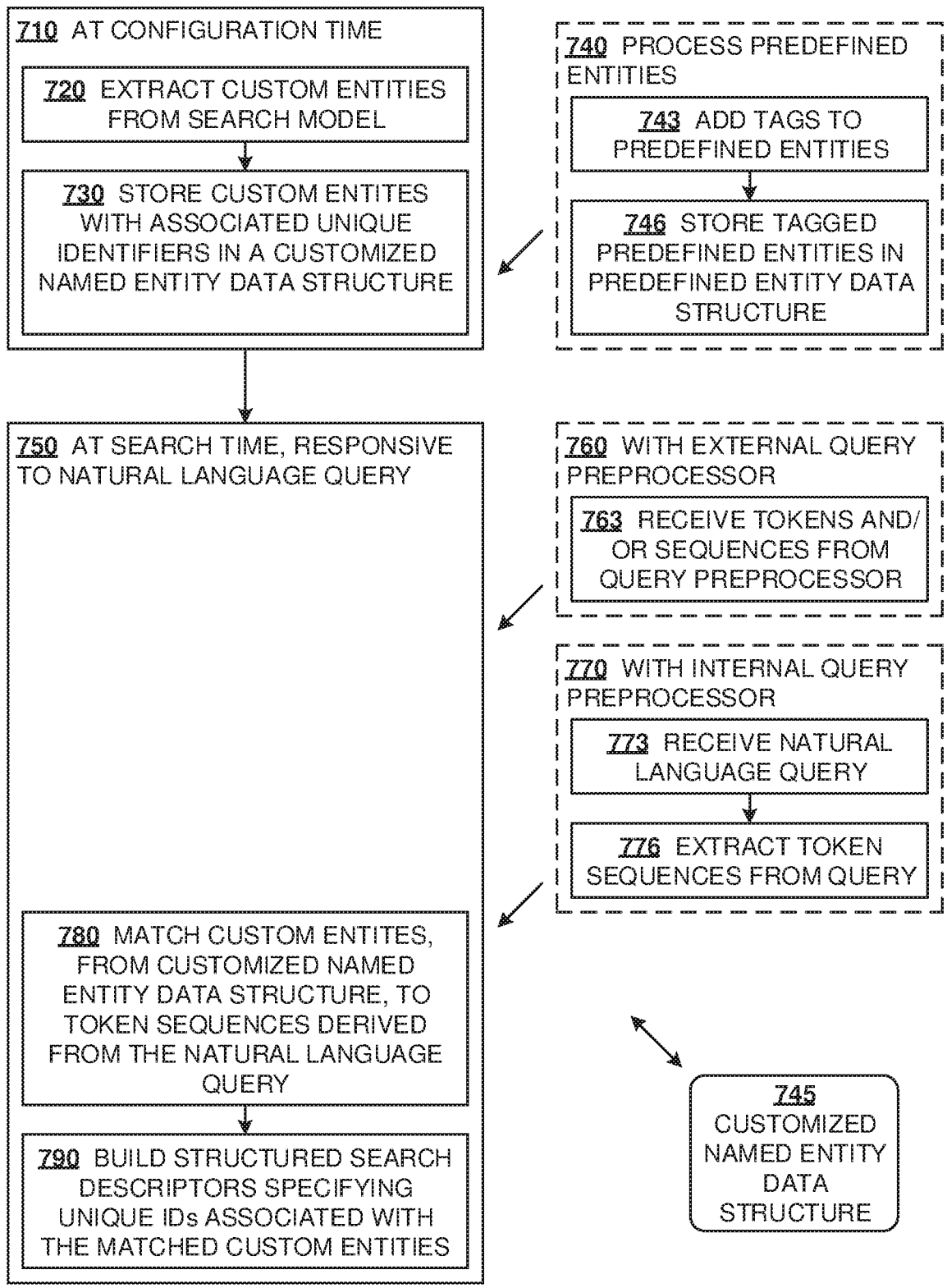
FIG. 7 is a flowchart of an example method for building and using a custom entity data structure according to the disclosed technologies.

FIG. 7 is a flowchart 700 of an example method for building and using a custom entity data structure according to the disclosed technologies. This method encompasses both construction of a custom entity data structure, and its use to map a natural language query to one or more structured search descriptors.

Process block 710 describes operations performed at the time of configuring the custom entity data structure, so-called Configuration Time or Design Time. In examples, these operations can configure a customized custom entity data structure for a database environment. At process block 720, custom entities can be extracted from a search model, which can be a predefined search model for a database environment. Some techniques for extracting custom entities are described herein, however process block 720 is not limited to such techniques. At process block 730, the custom entities can be stored in a customized custom entity data structure 745, along with associated unique identifiers. In examples, these identifiers can be DUIs of objects underlying the custom entities or of associated objects.

Process block 750 describes operations performed at the time of processing a natural language query, so-called Search Time, using the customized custom entity data structure 745 built or updated at block 710. Process blocks 780, 790 can be performed in response to a natural language query. At process block 780, one or more custom entities from the structure 745 can be matched to respective token sequences derived from the natural language query. At process block 790, one or more structured search descriptors can be built from the matched custom entities. The structured search descriptors can retain the associated unique identifiers of their constituent custom entities.

Optional process blocks 760, 770 describe some variations on the method of flowchart 700 relating to obtaining tokens or token sequences from a natural language query. In varying examples, the token extraction can be performed within an implementation of the disclosed technology, or can be performed by a distinct query preprocessor external to a disclosed software system. Process block 760 describes an operation with an external query preprocessor. At process block 763, tokens or token sequences can be received from the query preprocessor. That is, the input query can be directed to the query preprocessor, and a list of tokens can be conveyed or transmitted from the query preprocessor to a software module executing block 780. As an alternative, process block 770 describes operations with an integrated query preprocessor. At process block 773, the natural language query can be received, for example from a user interface coupled to a user input device such as a keyboard. At process block 776, tokens or token sequences can be extracted from the query text.

Optional process block 740 describes a variation on the method of flowchart 700 relating to predefined entities, which can also be provisioned with tags. Tags on predefined entities permits ready comparison with tags of custom entities, to determine, for example, whether a particular predefined entity can be a value for a given custom entity. At process block 743, tags can be added to one or more predefined entities. At process block 746, the tagged predefined entities can be stored in a predefined entity data structure.

Examples of the disclosed technology can provide or utilize additional text processing, including functions such as recognition of operators, commands, or disregarded tokens; consolidation of tokens into progressively larger token sequences; spelling correction, or machine translation from a user's language to a native natural language (e.g. German or English) of the database environment. In examples, these additional functions can variously be distributed between external software modules (e.g. bundled with block 763), block 780, or another software module of block 750. Text processing from an external service can also be supported.

In examples, the method of flowchart 700 can be extended to perform a structured search on a database environment, using one or more of the structured search descriptors from block 790. Results of the structured search can be stored, presented to a user, or transmitted to a remote client.

Example Software Architecture

Figure 8:
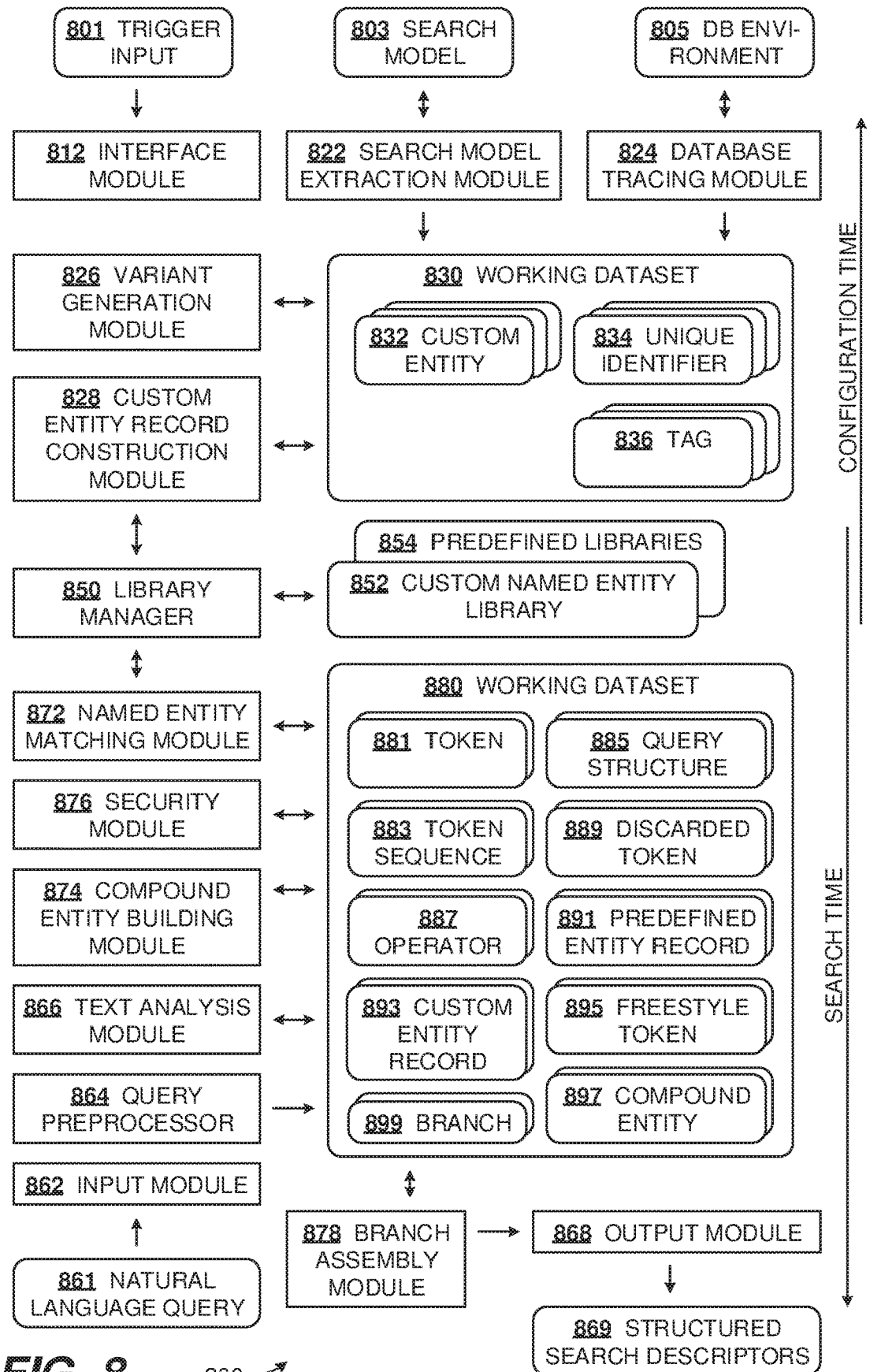
FIG. 8 is a block diagram of an example software architecture for implementing disclosed technologies.

FIG. 8 is a block diagram 800 of an example software architecture for implementing disclosed technologies. This diagram depicts architecture components both for configuration time operations of building or updating a custom entity library, and for search time operations of processing a natural language query. Software modules are illustrated as rectangles with square corners. Other items, including working data, input and output data or data stores, and a trigger input are illustrated as rectangles with rounded corners.

At the center of the diagram is a custom named entity library 852, coupled to a library manager 850. Above these components are shown software modules and a working dataset 830 used at configuration time. Below the library manager 850 are shown software components and a working dataset 880. In some examples, the configuration time and search time software can be deployed together, similar to diagram 800. This can support ongoing maintenance of the custom entity library 852, with updates according to various trigger events as described herein.

However, in other examples, the configuration time and search time software can be deployed independently, each having its own library manager, which can be copies of a single library manager or not. Particularly, configuration time and search time library managers can have one or more distinct functions. In separated deployments, even using different library managers, a custom entity library can be shared between the configuration time and search time software, for example on a shared storage medium, or accessible as a service to both the configuration time and search time software. In other examples, a custom entity library created at configuration time can be copied to a location accessible to the search time software. Accordingly, the configuration time software can implement just the top half of diagram 800, optionally including or excluding the custom entity library 852 itself. Likewise, the search time software can implement just the bottom half of diagram 800, optionally including or excluding the custom entity library 852.

The description begins with the configuration time software. An interface module 812 can receive a trigger input 801 to commence building or updating the custom entity library 852. Generally, the remaining functions described in context of the design time software can be performed responsive to the trigger input 801. Example methods of some of these functions are described throughout this disclosure.

A search model extraction module 822 can read from search model 803 to navigate through the search model and extract assorted labels. The database tracing module 805 can read from the database (DB) environment 805, to trace back from the search model 803 into tables and descriptions that can be absent in the search model 803. For example, domain values can be obtained from the database environment 805. Either or both of search model extraction module 822 and database tracing module 824 can collect custom entities 832, DUIs 834, or tags 836, which can be saved in the working dataset store 830. The various data objects in the working store 830 can be linked (not shown), for example a given custom entity 832 can be linked to its associated DUIs 834 or tags 836. A variant generation module 826 can operate on custom entities 832 from the working store 830 to generate additional custom entities 832, of a Variant type, which can be stored back to the working store 830, linked to the DUIs or tags of their parent custom entity 832. A custom entity record construction module 828 can prepare records of the custom entities 832, each with its associated DUIs 834, if any, and tags 836, if any. The record construction module 828 can forward one or more custom entity records of the library manager 850 for storage in custom named entity library 852. Shown alongside custom entity library 852 is a library 854 of predefined entities. Predefined entity library 854 can be read or updated by the same library manager 850 used to interface with the custom library 852, or by a different module (not shown). In some examples, another named entity library (not shown) can be provided for relational operators.

Turning to the search time software, an input module 862 can receive a natural language query 861. An output module 868 can deliver structured search descriptors 869 to a structured search software package (e.g. for execution of the structured search, or for further processing of the delivered structured search descriptors), or to a client (e.g. a client from which the natural language query 861 was received). Generally, the remaining functions described in context of the design time software can be performed responsive to the trigger input 861. Some of these functions can be directed towards producing the output structured search descriptors 869. Example methods are described throughout this disclosure.

A query preprocessor 864 can tokenize the input query, to produce tokens 881 or token sequences 883, which can be stored in a working dataset store 880. In some examples, the preprocessor 864 can also perform other text processing functions, such as token classification, language translation, or spelling correction. A text analysis module 866 can identify parts of speech; can determine a structure 885 of the query; or can identify relational operators 887 or tokens for discard 889. Discarded tokens can include nonce words (e.g. "a", "the", or some prepositions), and can also include command words (e.g. "show" "sort" "print") which pertain to the results of the search and not the desired structured search per se.

Named entity matching module 872 can operate on text tokens 881 or sequences 883 to find matching custom entities in the custom named entity library 852, via its interface, the library manager module 850. Along with identifying custom named entities, the matching module 872 can also retrieve matches from the predefined entity libraries 854, or from libraries of relational operators. Records 893, 891 of these matching custom and predefined entities can be stored in the working dataset 880. Security module 876 can implement authorization checks to verify that a user providing the query input 861 has sufficient permissions to access the matched custom entity records 893. Any unauthorized custom entities can be deleted from the working dataset 880 before they are used to build compound entities or branches, or before they are outputted. Although predefined entities 891 may not have specific security concerns in and of themselves, in some scenarios a user's permissions can be circumscribed based on predefined entities. To illustrate, a user may have access to records from Germany but not from Denmark. Accordingly, security module can implement a similar functionality of screening predefined entity records 891 and deleting as needed.

Compound entity matching module 874 can identify and build compound entities, including types Entity Value Pair or Entity Lookup Pair, as described herein. Compound entity records 897, including DUIs or tags as can be inherited from underlying custom entity records 893, can also be stored in the working store 880. Branch assembly module 878 can combine custom entity records 893, predefined entity records 891, compound entity records 897, together with remaining freestyle tokens 895, to produce branches 899 spanning the input query 861, which can be output as structured search descriptors via output module 868. A single query can result in varying numbers of branches 899, ranging from zero, 1, 2, or more, up to 5, 10, 20, 50, 100, 200, 500, or 1000, or even more. In some instances, a custom entity record 893 or a compound entity record 897 can itself span the search query and can be outputted accordingly. In further examples, a custom entity record 893 or a compound entity record 897 can be non-spanning but still usable as a structured search descriptor, and outputted accordingly.

Example Custom Entity Record Structure

Figure 9:
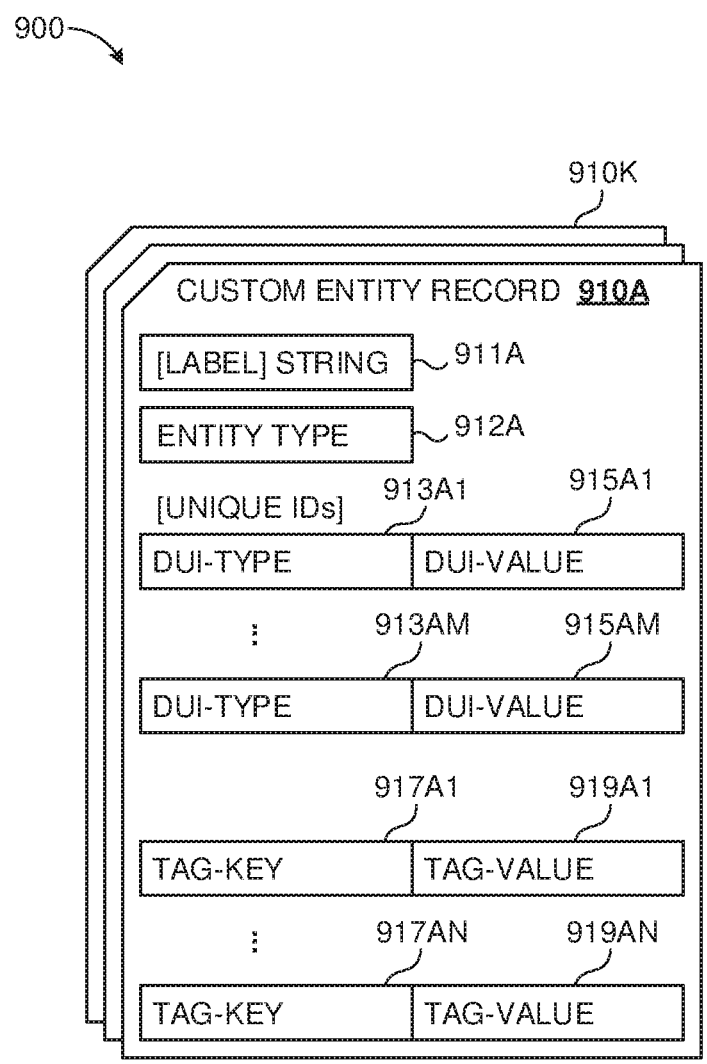
FIG. 9 is a diagram of an example custom entity record structure according to the disclosed technologies.

FIG. 9 is a diagram 900 of an example custom entity record structure according to the disclosed technologies. Records 910A-910K for respective custom entities can be organized as a data structure or library in memory, in one or more disk files, or in the cloud, or distributed among these, in any combination.

A custom entity record 910A can include a label 911A of the custom entity, which can be a text string. This string of text can match or be derived from some label obtained from a search model or database environment as described herein, and can be anticipated to match some portion of a natural language query. Record 910A can also include a field 912A indicating a type of custom entity, e.g. LDO Value, Table Attribute Variant, etc.

Record 910A can further include a list of DUIs. Each DUI can be stored as a pair, indicating a type 913A1-913AM of the DUI (e.g. Table Attribute ID, Domain ID, LDO ID, or Model ID) and a corresponding value 915A1-915AM (e.g. a 128-bit binary field or a text string). As described herein, the DUIs can identify specific entities within a database environment, such as a column of a table, or an LDO. Commonly, a custom entity can have one or more DUIs. However, a predefined entity need not have any DUIs. In varying examples, all, some, or none of predefined entities can have associated DUIs.

Record 910A can also include a list of tags. Each tag can be stored as a key-value pair. The keys 917A1-917AN can be datatype, length, semantics, or other tags not limited to those described herein. The values 919A1-919AN can be the particular values of these respective keys for the custom entity 910A.

The record structure illustrated here is conceptual. An actual implementation can use a linked list, a linear list, a table, a hash table, links to a sea of key-value pairs, or another data structure. The implementation can use additional fields not shown, such as a field indicating a type of the instant record; fields indicating a number of DUIs or a number of tags; fields indicating the date(s) on which the record was created or updated; or fields indicating a software, database, or search model version number from which the custom entity was extracted or derived. Data items shown included within the record 910A can be substituted by links, with the actual data content stored outside the record. The DUI type 913A1-913AM or the tag keys 917A1-917AN can be implicit. To illustrate, for an example with 8 possible tag keys, all records 910A-910K can have a fixed size list of 8 tag fields, where the first field contains a value for e.g. datatype, a second field contains a value for length, and so on. A similar fixed structure can also be used for the DUIs. In some examples, the records can be stored in inverted form, e.g. as an index, so that a particular DUI or tag key-value pair has a list of the custom entities associated with it. In further examples, both direct (as illustrated) and inverted forms can be stored, for improved runtime efficiency.

At a higher level, a custom entity library can be organized as a flat collection of custom entity records, or can be organized according to type of custom entity, according to parent LDO, according to a version number, or as a predefined logical structure.

Additional Examples and Features

Example Custom Entity Types

Table 1 summarizes some custom entity types that can be used in some examples, together with a brief description or example. In other examples, fewer, more, or different custom entity types can be used.

TABLE 1

| Custom entity type | Description | Examples |
|---|---|---|
| LDO Label | The label of an LDO. | "Parts Suppliers" "Sales Order" |
| LDO Variant | A variant of an LDO label. | "Suppliers" "Vendors" "Order" |
| Table Attribute Label | The label of a table column or other table attribute. | "City of Departure" "Delivery Status" |
| Table Attribute Variant | A variant of a table attribute label. | "City" "Status" |
| Domain Value | A value of an enumerated datatype. | "In Transit" "Lost" "Munich" |
| Freestyle | Denotes a custom entity that is used at search time without being part of a compound entity. The term freestyle is not limited to custom entities, as named entities other than custom entities can also be used as freestyle named entities. Tokens and token sequences that are not named entities can also be freestyle. | |

Example Database Unique Identifiers (DUIs)

Table 2 summarizes some DUIs that can be used in some examples, together with a brief description and an indication of some custom entity types to which each DUI can be applicable. In other examples, fewer, more, or different tag keys can be used.

TABLE 2

| DUI type | DUI Description | Custom Entity Type |
|---|---|---|
| Model identifier | Database unique identifier of a search model | LDO Label, LDO Variant, Table Attribute Label, Table Attribute Variant, Freestyle |
| Table attribute identifier | Database unique identifier of a table attribute | Table Attribute Label, Table Attribute Variant |
| LDO identifier | Database unique identifier of an LDO | LDO Label, LDO Variant |
| Domain identifier | Database unique identifier of a domain (e.g. D_DeliveryStatus or D_BloodType) for values of a table column, or the domain to which a domain value belongs. | Table Attribute Label, Table Attribute Variant, Domain Value |

Example Tag Keys

Table 3 summarizes some tag keys that can be used in some examples, together with a brief description and an indication of some custom entity types to which each tag key can be applied. In other examples, fewer, more, or different tag keys can be used.

TABLE 3

| Tag Key | Tag Description and Example Value | Custom Entity Type |
|---|---|---|
| Semantics | This tag can indicate a class of meaning for a particular named entity. Examples are a table column "City of Departure" can have a tag with | Table Attribute Label, Table Attribute Variant |

TABLE 3-continued

| Tag Key | Tag Description and Example Value | Custom Entity Type |
|---|---|---|
| | tag-key = "Semantics" and tag-value = "Locality". A column "Weight" can have a tag with tag-key = "Semantics" and tag-value = "Measure Amount". Other Semantics tag-values can include "Currency Amount", "URL", "Email address", and so forth. | |
| Datatype | This tag can indicate the datatype of values associated with a particular table attribute. The datatype can be a simple or atomic datatype such as integer, Boolean, string; or the datatype can be complex datatype such as Date-Time or binary-large-object (BLOB). To illustrate, a table column "Delivery Status" can have a datatype "D_DeliveryStatus" indicating its enumerated datatype (a domain). A domain value "DELIVERY_DATE" can have a tag with tag-key = "datatype" and tag-value ="Date-Time". | Table Attribute Label, Table Attribute Variant, Domain Value |
| Measure unit | A column labeled "Weight" can have a tag with tag-key = "Measure unit" and tag-value = "kg", indicating that the field values in the Weight column are in units of kilograms. | Table Attribute Label, Table Attribute Variant |
| Currency unit | A column labeled "Price" can have a tag with tag-key = "Currency unit" and tag-value = "USD", indicating that the field values in the Price columns are in units of U.S. dollars. | Table Attribute Label, Table Attribute Variant |
| Length | A column labeled "Employee_ID" can have a tag with tag-key = "Length" and tag-value = "11", indicating that the column label has a maximum length of 11. | Table Attribute Label, Table Attribute Variant |
| Keyword | This tag can indicate a property of a table attribute or other object indicated by a named entity, and can be derived from a search model or from linguistic analysis of the named entity. A tag with tag-key = "Keyword" can have a wide range of tag-values. In some examples, semantics tags can have a closed set of values while keyword tags can have an open set of values. Thus, a keyword can qualify a relatively broad semantics tag, or provide information beyond the semantic content of a label. For a tag-key "Keyword", some exemplary tag-values include "month" "year" (e.g. qualifying a semantic tag of "Date"), "latitude", "longitude" (e.g. qualifying a semantic tag of "Location"), or "home", "office", "mobile (e.g. qualifying a semantic tag of "Phone number"), or "Read Only" (e.g. indicating that a table column is not modifiable). | LDO Label, LDO Variant, Table Attribute Label, Table Attribute Variant, Freestyle |

Custom Entities at Search Time

In some examples, additional custom entities of Variant type can be generated at search time. To illustrate, a custom entity for a column label "Weight of assembled product" can be extracted from a search model at configuration time. This custom entity can have a Table Attribute Label type. Additionally, by analysis of the label, "Weight" can be determined to be the head of the label, and accordingly another custom entity of type Table Attribute Variant with label "Weight" can also be created at configuration time.

To support search time Variant custom entities, the analysis at configuration time, such as performed at process block 326 or by module 826, can additionally spawn tokens classified as LDO Variant Tokens or Table Attribute Variant Tokens as appropriate. These variant tokens can be stored along with an instant LDO Variant or Table Attribute Variant custom entity record, or stored separately and linked to such a custom entity record. In the present illustration, the Table Attribute Variant record for custom entity label "Weight" could include or be linked to Table Attribute Variant Tokens "assembled" and "product".

Then, at search time, a search query containing "assembled weight" or "product weight" can have "weight" recognized as matching the Table Attribute Variant custom entity "Weight", with subsequent matching of e.g. "assembled" from the attached or linked Table Attribute Variant Tokens. A new custom entity labeled "assembled weight" can be formed at search time based on this match and analysis of a natural language input query. In some examples, the new custom entity can be added to the custom entity library, while in other examples, the new custom entity can be saved in a temporary custom entity store while structured search descriptors are being created for the instant input query. Had the search query merely contained "assembled product" without the word "weight", generation of an additional custom entity can be skipped, because the head word "weight" is missing.

Predetermined Entity Examples

Table 4 provides some examples of predefined entities having tags. The first column shows a predefined entity for label "France", which can be a record (indicated by braces "{ }") within a predefined library of locations ("location: [ . . . ]"). The raw field is the label of this predefined entity, and type, country (country code), latitude ("lat"), longitude ("lng") are its tags. That is, the latitude tag has a tag-key "lat" with tag-value "46.227648", and similarly for the other tags.

The next column illustrates a record for a monetary predefined entity with label "1000 dollars" in a predefined library of "money" named entities. This predefined entity can have tag-keys "amount", "currency unit", and "dollars" as illustrated. The third column illustrates a record for a numerical predefined entity with label "forty two" in a predefined library of "number" named entities. A raw field specifies the label of the predefined entity, and a sole tag has tag-key="scalar" with tag-value=42.

TABLE 4

| "France" | "1000 dollars" | "forty two" |
|---|---|---|
| "location": [ { "raw": "France", "type": "country", "country": "FR", "lat": 46.227638, "long": 2.213749 } ] | "money": [ { "raw": "1000 dollars", "amount": 1000, "currency unit": "USD", "dollars": 1000 } ] | "number": [ { "raw": "forty two", "scalar": 42 } ] |

Searching an Entity Value Pair

Some table attributes can represent quantities with units, such as weight, temperature, price, etc. Example input query text such as "weight 3 kg", "melting point 100° C.", or "price 1000 dollars" can be recognized as ⟨Custom Entity, Predefined Entity⟩ entity value pairs, i.e. ⟨"Weight", "3 kg"⟩, ⟨"Melting point", "100° C."⟩, ⟨"price", "1000 dollars"⟩, respectively. In some examples, a structured search can search in a table column identified by a Table Attribute ID of the "Weight" custom entity for a value matching "3 kg". In other examples, the entity value pair determination can be predicated on the "Weight" custom entity having a tag with tag-key "Measure unit" and tag-value "kg", in which case the structured search can search in the "Weight" column for the value "3".

Searching an Entity Lookup Pair

Some table attributes can have mixed datatypes (e.g. some values can be numerical while other can be strings) or can have complex datatypes (e.g. multi-word strings). In such cases an entity lookup pair can allow searching the table attribute with a token or token sequence that can be different from a value of the attribute. For example, in a city database, a search query can include "building 54". The token "building" can be recognized as a table attribute labeled "Building", but "54" can manifest itself in various ways. A building on a college campus can be building E54. Other buildings can have addresses "54 First Street" or "3354 Alpha Avenue". A structured search of an entity lookup pair ⟨Custom Entity, Token Sequence⟩ can be implemented by searching the token sequence with the table attribute corresponding to the custom entity. In the illustration, "54" can be searched in a column "Building". Further, if the custom entity for "Building" is linked to DUIs of its table(s) or LDO(s), these tables and LDOs can also be searched for "54". This can lead to wider search scope than an entity attribute pair, but still considerably more efficient than an unconstrained search for "54" across the entire database environment.

A Generalized Computer Environment

Figure 10:
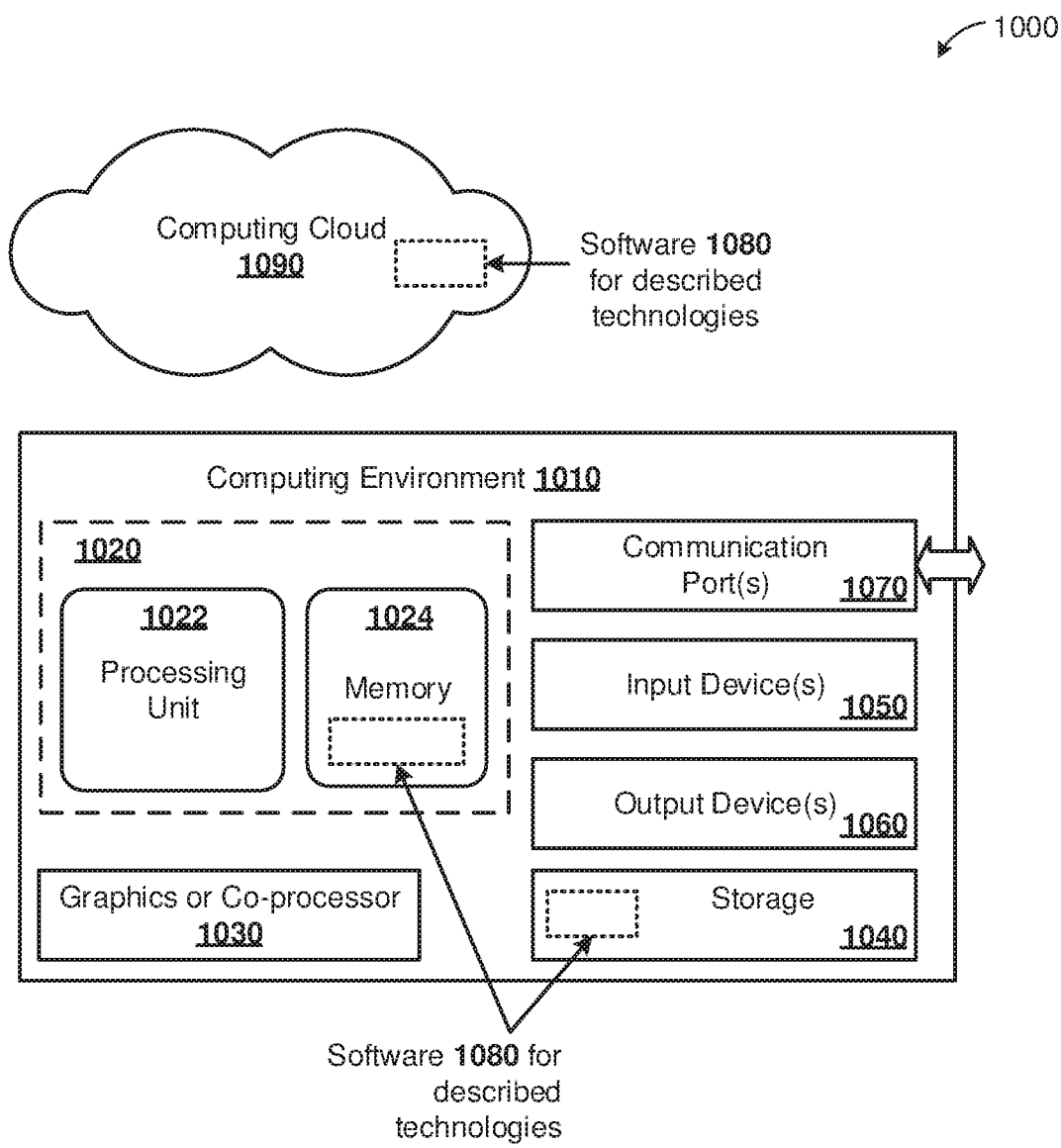
FIG. 10 is a diagram schematically depicting a computing environment suitable for implementation of disclosed technologies.

FIG. 10 illustrates a generalized example of a suitable computing system 1000 in which described examples, techniques, and technologies, including construction, deployment, operation, and maintenance of named entity facilities for natural language query processing, according to disclosed technologies can be implemented. The computing system 1000 is not intended to suggest any limitation as to scope of use or functionality of the present disclosure, as the innovations can be implemented in diverse general-purpose or special-purpose computing systems.

With reference to FIG. 10, computing environment 1010 includes one or more processing units 1022 and memory 1024. In FIG. 10, this basic configuration 1020 is included within a dashed line. Processing unit 1022 executes computer-executable instructions, such as for implementing any of the methods or objects described herein for generation, customization, or update of a custom entity library, for processing natural language queries with custom entities, compound entities or spanning branches, or various other architectures, caches, components, handlers, managers, modules, repositories, or services described herein. Processing unit 1022 can be a general-purpose central processing unit (CPU), a processor in an application-specific integrated circuit (ASIC), or any other type of processor. In a multi-processing system, multiple processing units execute computer-executable instructions to increase processing power. Computing environment 1010 can also include a graphics processing unit or co-processing unit 1030. Tangible memory 1024 can be volatile memory (e.g., registers, cache, or RAM), nonvolatile memory (e.g., ROM, EEPROM, or flash memory), or some combination thereof, accessible by processing units 1022, 1030. The memory 1024 stores software 1080 implementing one or more innovations described herein, in the form of computer-executable instructions suitable for execution by the processing unit(s) 1022, 1030. The memory 1024 can also store custom entity libraries, search models, working data sets, configuration data, UI displays, browser code, data structures including data tables, working tables, change logs, output structures, input fields, output fields, data values, indices, or flags, as well as other configuration and operational data.

A computing system 1010 can have additional features, such as one or more of storage 1040, input devices 1050, output devices 1060, or communication ports 1070. An interconnection mechanism (not shown) such as a bus, controller, or network interconnects the components of the computing environment 1010. Typically, operating system software (not shown) provides an operating environment for other software executing in the computing environment 1010, and coordinates activities of the components of the computing environment 1010.

The tangible storage 1040 can be removable or non-removable, and includes magnetic disks, magnetic tapes or cassettes, CD-ROMs, DVDs, or any other medium which can be used to store information in a non-transitory way and which can be accessed within the computing environment 1010. The storage 1040 stores instructions of the software 1080 (including instructions and/or data) implementing one or more innovations described herein.

The input device(s) 1050 can be a mechanical, touch-sensing, or proximity-sensing input device such as a keyboard, mouse, pen, touchscreen, trackball, a voice input device, a scanning device, or another device that provides input to the computing environment 1010. The output device(s) 1060 can be a display, printer, speaker, optical disk writer, or another device that provides output from the computing environment 1010.

The communication port(s) 1070 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1000 can also include a computing cloud 1090 in which instructions implementing all or a portion of the disclosed technology are executed. Any combination of memory 1024, storage 1040, and computing cloud 1090 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 11:
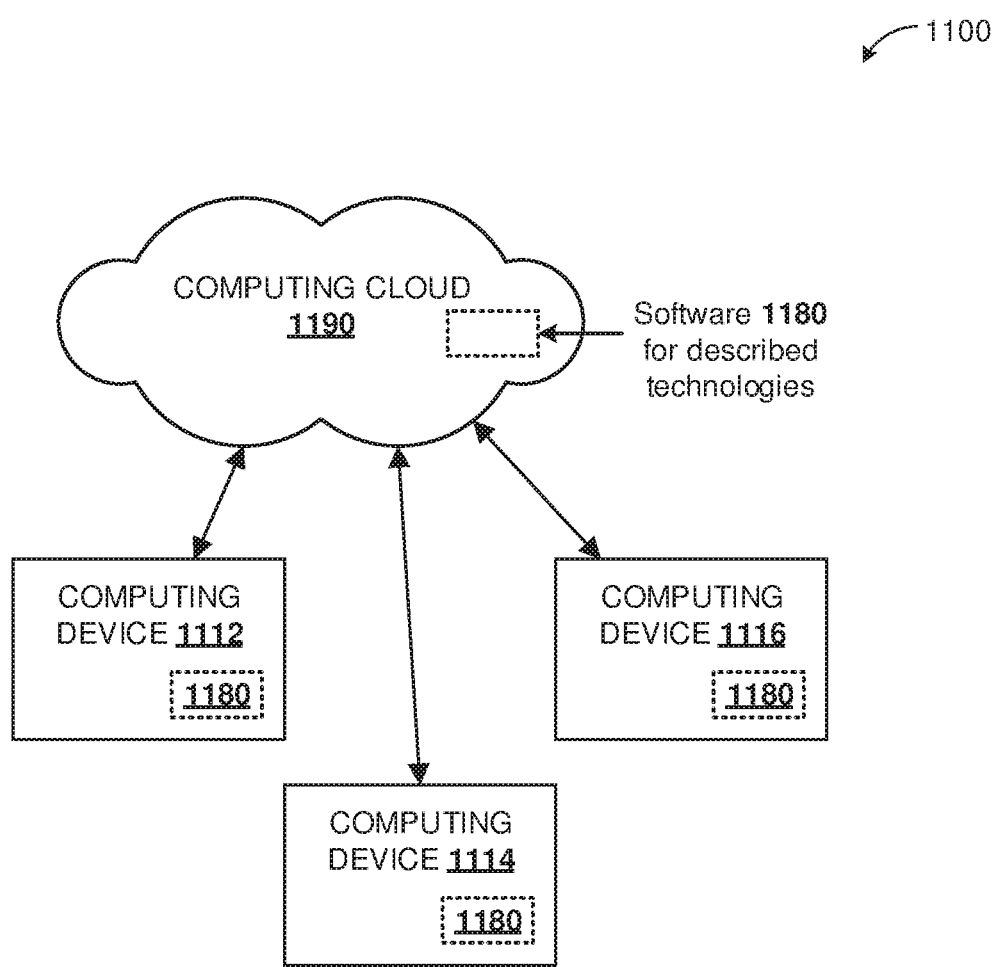
FIG. 11 is a diagram schematically depicting computing devices operating in conjunction with a computing cloud for implementation of disclosed technologies.

FIG. 11 depicts an example cloud computing environment 1100 in which the described technologies can be implemented. The cloud computing environment 1100 comprises a computing cloud 1190 containing resources and providing services. The computing cloud 1190 can comprise various types of cloud computing resources, such as computer servers, data storage repositories, networking resources, and so forth. The computing cloud 1190 can be centrally located (e.g., provided by a data center of a business or organization) or distributed (e.g., provided by various computing resources located at different locations, such as different data centers and/or located in different cities or countries).

The computing cloud 1190 can be operatively connected to various types of computing devices (e.g., client computing devices), such as computing devices 1112, 1114, and 1116, and can provide a range of computing services thereto. One or more of computing devices 1112, 1114, and 1116 can be computers (e.g., servers, virtual machines, embedded systems, desktop, or laptop computers), mobile devices (e.g., tablet computers, smartphones, or wearable appliances), or other types of computing devices. Communication links between computing cloud 1190 and computing devices 1112, 1114, and 1116 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1112, 1114, and 1116 can also be connected to each other.

Computing devices 1112, 1114, and 1116 can utilize the computing cloud 1190 to obtain computing services and perform computing operations (e.g., data processing, data storage, and the like). Particularly, software 1180 for performing the described innovative technologies can be resident or executed in the computing cloud 1190, in computing devices 1112, 1114, and 1116, or in a distributed combination of cloud and computing devices.

GENERAL CONSIDERATIONS

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "add," "attach," "build," "check," "collect," "configure," "consolidate," "define," "delete," "determine," "execute," "extract," "form," "forward," "generate," "identify," "link," "maintain," "manage," "map," "match," "obtain," "parse," "perform," "process," "provide," "receive," "remove," "request," "respond," "retrieve," "send," "search," "set," "span," "split," "store," "tokenize," "transmit," "trace," "trigger," "update," or "use" to indicate computer operations in a computer system. These terms denote actual operations that are performed or managed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1024, and storage 1040. The term computer-readable storage media does not include signals and carrier waves. In addition, the term computer-readable storage media does not include communication ports (e.g., 1070) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Ada, Angular, B#, C, C++, C#, Curl, Dart, Fortran, Go, Java, JavaScript, Julia, Lisp, Matlab, Octave, Perl, Python, R, Ruby, Rust, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of building a custom named entity library for a relational database environment, the method comprising:
    extracting a plurality of custom entities from a structured search model for the relational database environment, wherein each of the custom entities is a word or sequence of words having a respective meaning with reference to the relational database environment and wherein a given one of the custom entities is of a table attribute type and is associated with a corresponding table attribute of the relational database environment; and
    for each of the plurality of custom entities:
        forming a library record associating the custom entity with one or more database unique identifiers and one or more tags; and
        storing the library record in the custom named entity library; and
    for the given custom entity:
        determining that values of the corresponding table attribute have an enumerated datatype;
        identifying domain values of the enumerated datatype from a data structure of the relational database environment, wherein the domain values are unavailable in the structured search model;
        forming respective additional library records for the identified domain values as additional custom entities of a domain value type; and
        storing the additional library records in the custom named entity library;
    wherein the custom named entity library is stored in a non-transitory computer-readable storage for subsequent transformation of a natural language query for the relational database environment into one or more structured search descriptors.

2. The method of claim 1, wherein the structured search model comprises searchable labels and data objects associated with the relational database environment, and the relational database environment supports structured searches based on the structured search model.

3. The method of claim 1, wherein the custom entities comprise one or more of a plurality of types including: logical data object type, table attribute type, table attribute variant type, freestyle type, and domain value type.

4. The method of claim 1, wherein a given one of the custom entities is of a table attribute type and includes multiple words, the method further comprising:
    identifying a given word of the multiple words as a head of the given custom entity; and
    forming another library record for the given word as a custom entity of a table attribute variant type.

5. The method of claim 1, wherein a given one of the custom entities is associated with at least two of the database unique identifiers.

6. The method of claim 5, wherein the at least two database unique identifiers comprise a first identifier corresponding to a table attribute of a table of the relational database environment, and a second identifier corresponding to a data object associated with the table.

7. The method of claim 1, wherein each of the one or more tags has a corresponding tag key and a tag value, with the tag key being selected from: semantics tag, datatype tag, measure unit tag, currency unit tag, or length tag.

8. A method of serving a natural language query on a database environment using a structured search descriptor, the method comprising:
- receiving the natural language query from a client;
- tokenizing the natural language query into a plurality of tokens;
- from a custom named entity library of the database environment, identifying at least one custom entity for a sequence of at least some of the plurality of tokens, wherein each of the at least one custom entity is a word or sequence of words having a respective meaning with reference to the database environment;
- building a compound entity from the identified at least one custom entity and one or more other tokens of the plurality of tokens, wherein the compound entity comprises an entity value pair including a given one of the identified at least one custom entity and a corresponding value and the building further comprises:
  - (a) determining that at least some of the one or more other tokens are a token sequence representing a predefined entity having second tags that are compatible with the tags of the given custom entity, and setting the corresponding value to be the predefined entity; or
  - (b) determining that at least some of the one or more other tokens are a token sequence representing a second custom entity having second database unique identifiers that are compatible with the database unique identifiers of the given custom entity, and setting the corresponding value to be the second custom entity;
- incorporating the compound entity into a structured search descriptor;
- executing a structured search on the database environment using the structured search descriptor; and
- transmitting results of the structured search to the requesting client over a network.

9. The method of claim 8, comprising:
- (a) the determining that at least some of the one or more other tokens are a token sequence representing a predefined entity having second tags that are compatible with the tags of the given custom entity, and the setting the corresponding value to be the predefined entity.

10. The method of claim 8, comprising:
- (b) the determining that at least some of the one or more other tokens are a token sequence representing a second custom entity having second database unique identifiers that are compatible with the database unique identifiers of the given custom entity, and the setting the corresponding value to be the second custom entity.

11. The method of claim 8, further comprising, prior to the receiving action:
- configuring the custom named entity library for the database environment by:
  - extracting custom entities from a search model for the database environment; and
  - storing the custom entities with associated database unique identifiers in the custom named entity data library.

12. The method of claim 8, further comprising:
- building a branch comprising the compound entity and spanning the received natural language query.

13. The method of claim 12, wherein the compound entity is a first compound entity and the branch further comprises a second compound entity, distinct from the first compound entity, wherein the second compound entity is an entity lookup pair.

14. The method of claim 12, wherein the branch is a first branch, and further comprising:
- building one or more additional branches, distinct from the first branch and from each other, spanning the received natural language query.

15. The method of claim 14, wherein two branches, among the first branch and the one or more additional branches, correspond to different logical data objects.

16. One or more computer-readable media storing instructions which, when executed by one or more hardware processors, cause the one or more hardware processors to perform operations for building a structured search descriptor from a natural language query on a relational database environment, the operations comprising:
- receiving the natural language query;
- tokenizing the natural language query into a plurality of tokens;
- from a custom named entity library of the relational database environment, identifying a custom entity for a sequence of at least some of the plurality of tokens, wherein each of the custom entity is a word or sequence of words having a specified meaning with reference to the relational database environment;
- building a compound entity from the identified custom entity and one or more other tokens of the plurality of tokens, wherein the compound entity comprises an entity lookup pair including the identified custom entity and a corresponding token sequence, wherein the building comprises:
  - obtaining a first token sequence, formed by at least some of the one or more other tokens, that is proximate to the sequence of at least some of the plurality of tokens;
  - determining that the first token sequence is an open-class part of speech; and
  - setting the corresponding token sequence to be the first token sequence;
- incorporating the compound entity into a structured search descriptor; and
- causing the structured search descriptor to be transmitted to a structured search engine of the relational database environment, for execution of a search to obtain query results for the natural language query.

17. The one or more computer-readable media of claim 16, wherein the operations further comprise:
- receiving the tokens from a query preprocessor.

18. The one or more computer-readable media of claim 16, wherein the operations further comprise:
- building a branch comprising the compound entity, the branch spanning the received natural language query.

19. The one or more computer-readable media of claim 18, wherein the branch is a first branch, and the operations further comprise:
- building one or more additional branches, distinct from the first branch and from each other, spanning the received natural language query.

20. The one or more computer-readable media of claim 19, wherein the first branch and the one or more additional branches collectively comprise two branches corresponding to different logical data objects.

* * * * *